United States Patent
Zhou et al.

(10) Patent No.: US 9,928,437 B2
(45) Date of Patent: Mar. 27, 2018

(54) METHOD AND SYSTEM FOR CRYSTAL IDENTIFICATION

(71) Applicant: SHANGHAI UNITED IMAGING HEALTHCARE CO., LTD., Shanghai (CN)

(72) Inventors: Xin Zhou, Shanghai (CN); Liping Li, Shanghai (CN); Qiang Li, Shanghai (CN); Xinyu Lv, Shanghai (CN); Shaohui An, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 0 days.

(21) Appl. No.: 15/142,295

(22) Filed: Apr. 29, 2016

(65) Prior Publication Data

US 2016/0321808 A1   Nov. 3, 2016

(30) Foreign Application Priority Data

Apr. 29, 2015  (CN) .......................... 2015 1 0214482
Sep. 14, 2015  (CN) .......................... 2015 1 0581907

(51) Int. Cl.
  *G06K 9/20*   (2006.01)
  *G06K 9/46*   (2006.01)
  *G01T 1/164*  (2006.01)

(52) U.S. Cl.
  CPC .............. *G06K 9/20* (2013.01); *G01T 1/1648* (2013.01); *G06K 9/4642* (2013.01)

(58) Field of Classification Search
  CPC ...... G06K 9/20; G06K 9/4642; G01T 1/1648; G06T 7/0028; G06T 11/60; A61B 6/037; A61B 6/5235; A61B 6/585
  See application file for complete search history.

(56) References Cited

U.S. PATENT DOCUMENTS 8,278,625 B2   10/2012  Sato et al.
  2007/0271206 A1  11/2007  Hu et al.
  (Continued)

FOREIGN PATENT DOCUMENTS

CN   103065313 A   4/2013
  CN   103914860 A   7/2014

OTHER PUBLICATIONS

Stronger, K.A. and M.T. Johnson, Optimal Calibration of PET Crystal Position Maps Using Gaussian Mixture Models, Feb. 2004, p. 85-90, 51(1), IEEE Transactions on Nuclear Science.
(Continued)

*Primary Examiner* — Duy M Dang
(74) *Attorney, Agent, or Firm* — Metis IP LLC

(57) ABSTRACT

Some embodiments of the present disclosure relates to a method and system for generating crystal lookup table (CLT) based on a flood histogram. The method may include receiving a flood histogram of a subject; determining a crystal central position map based on the flood histogram, the crystal central position map including a plurality of crystal central positions, forming rows and columns of the plurality of crystal central positions to generate a labelled crystal lookup table, forming a template based on the rows and the columns in the labelled crystal central position map, and correcting the labelled crystal central position map based on the template and the flood histogram to obtain a corrected crystal central position map. A crystal lookup table may be formed.

20 Claims, 13 Drawing Sheets

(56) References Cited

U.S. PATENT DOCUMENTS

| | | |
|---|---|---|
| 2009/0094180 A1 | 4/2009 | Hu |
| 2011/0101227 A1 | 5/2011 | Tseng et al. |
| 2013/0077827 A1 | 3/2013 | Laurence et al. |

OTHER PUBLICATIONS

Wei, Q., et al., A neighborhood standard deviation based algorithm for generating PET crystal position maps, 2013, IEEE Nuclear Science Symposium and Medical Imaging Conference Record (NSS/MIC).

Yoshida, E., et al., Calibration procedure for a DOI detector of high Resolution PET Through a Gaussian Mixture Model, Oct. 2004, 51(5): 2543-49, IEEE Transactions on Nuclear Science.

Hu, D., et al., A neural network based algorithm for building crystal look-up table of PET block detector, 2006, 2458-61, IEEE Nuclear Science Symposium and Medical Imaging Conference Record (NSS/MIC).

Hu, D. and T. Gremillion, Verification of neural network based algorithm for crystal identification of PET block detector, 2007, 2847-50, IEEE Nuclear Science Symposium and Medical Imaging Conference Record (NSS/MIC).

Lazzerini, B., F. Marcelloni, and G. Marola, Calibration of positron emission tomograph detector modules using new neural method, Mar. 18, 2004, 40(6), Electronic Letters.

Kang, X., et al., A fast accuracy crystal identification method based on FCM Clustering Algorithm for MicroPET, 2008, 779-82, IEEE Nuclear Science Symposium and Medical Imaging Conference Record (NSS/MIC).

Chaudhari, A.J., et al., Crystal identification in positron emission tomography using nonrigid registration to a Fourier-based template, 2008, 53: 5011-27, Physics in Medicine and Biology.

Chaudhari, A.J., et al., Spatial Distortion Correction and Crystal Identification for MRI-Compatible Position-Sensitive Avalanche Photodiode-Based PET Scanners, Jun. 2009, 56(3): 549-56, IEEE Transactions on Nuclear Science.

Breuer, J. and K. Wienhard, PCA-Based Algorithm for Generation of Crystal Lookup Tables for PET Block Detectors, Jun. 2009, 56(3): 602-07, IEEE Transactions on Nuclear Science.

Chen, X., et al., Fast online crystal identification algorithm in positron emission tomography, Apr. 2013, 8(4): 282-86, China Science Paper.

Vincent, L. and P. Soille, Watersheds in digital spaces: an efficient algorithm based on immersion simulations, Jun. 1991, 13(6): 583-98, IEEE Transactions on Pattern Analysis and Machine Intelligence.

Du, H. and K. Burr, An algorithm for automatic flood histogram segmentation for a PET detector, 2012, 3488-92, IEEE Nuclear Science Symposium and Medical Imaging Conference Record (NSS/MIC).

Chaudhari, A.J., et al., Spatial distortion correction and crystal identification for position-sensitive avalanche photodiode-based PET scanners, 2008, IEEE Nuclear Science Symposium and Medical Imaging Conference Record (NSS/MIC).

Kang, X., et al., A new module-level parameter interfusion ratio (IR) to evaluate the performance of PET detector block, 2010, IEEE Nuclear Science Symposium and Medical Imaging Conference Record (NSS/MIC).

Kang, X. et al. Comparing Crystal Identification Algorithms for PET Block Detectors, 2008, 4562-66, IEEE Nuclear Science Symposium and Medical Imaging Conference Record (NSS/MIC).

Wei, Q., et al., Estimation of decoding error for light sharing based PET detector module using a Gaussian Mixture Model, 2013, IEEE Nuclear Science Symposium and Medical Imaging Conference Record (NSS/MIC).

Hu, Z., et al., Semi-automatic position calibration for a dual-head small animal PET scanner, 2007, 1618-21, IEEE Nuclear Science Symposium and Medical Imaging Conference Record (NSS/MIC).

Wang, X., H. Zhang, and G. Hu, A simple and robust method for fast crystal identification, 2012, 1264-67, IEEE Nuclear Science Symposium and Medical Imaging Conference Record (NSS/MIC).

Schmand, M., et al., Performance results of a new DOI detector block for a high resolution PET—LSO research tomography HRRT, Dec. 1998, 45(6): 3000-06, IEEE Transactions on Nuclear Science.

Rogers, J.G., et al., An improved multicrystal 2-D BGO detector for PET, 1992, 39(4): 1063-68, IEEE Transactions on Nuclear Science.

Di, K., Edge-based peak position search algorithm for PET detectors, 2011, Department of Computer Science, California State University.

Aurenhammer, F., Voronoi diagrams-a survey of a fundamental geometric data structure, Sep. 1991, 23(3): 345-405, ACM Computing Surveys.

P. Chai and B.C. Shan, Establishment of crystal position table for block detector of positron emission tomography, 2009, 39(1): 103-08, Science in China Press.

First Office Action for Chinese Application No. 201510214482.5 dated Dec. 9, 2016, 11 pages.

Second Office Action for Chinese Application No. 201510214482.5 dated Apr. 5, 2017, 8 pages.

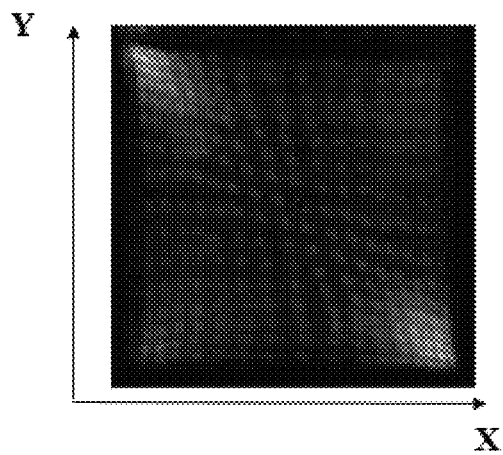
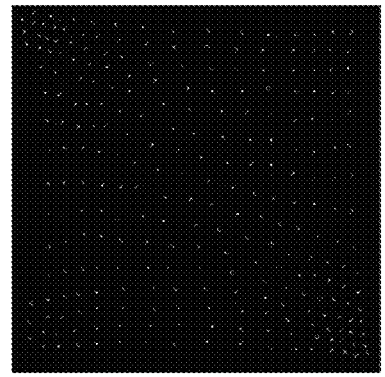
FIG. 13B					FIG. 13C
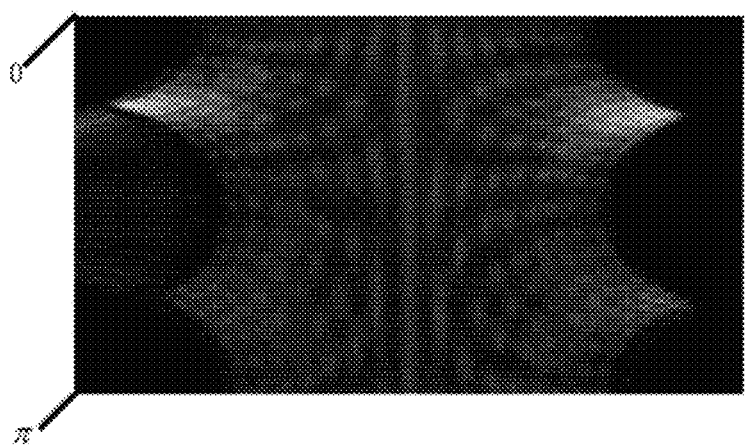
FIG. 13D
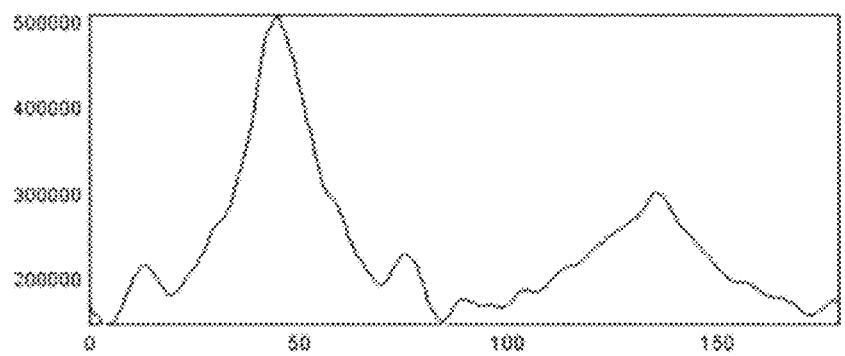
FIG. 13E

METHOD AND SYSTEM FOR CRYSTAL IDENTIFICATION

CROSS-REFERENCE TO RELATED APPLICATIONS

This application claims priority to Chinese Patent Application Nos. CN 201510214482.5 filed on Apr. 29, 2015, and CN 201510581907.6, filed on Sep. 14, 2015. The contents of each of which are incorporated hereby by reference.

TECHNICAL FIELD

This application generally relates to a method and system for image processing of an imaging system with a positron emission tomography (PET) detector/scanner, and more particularly, this application relates to crystal identification.

BACKGROUND

Crystal identification may be performed for a single imaging modality system and/or a multi-modality imaging system with a positron emission tomography (PET) detector/scanner, especially for a high-resolution PET device. PET uses a large number of scintillator crystals (or referred to as crystals for brevity) of a small size in its detector blocks. The small size of the crystals may result in low signal-to-noise ratio (SNR); the large number of the crystals may lead to distortion of crystal array during signal encoding/decoding process, making it challenging to identify crystals in a PET detector.

Crystal identification may involve segmentation of a flood histogram into regions equal to the total number of scintillator crystals in the detector array, such that each region has one peak. A peak may correspond to the central position of the distribution of the events detected in one crystal. A region with a peak may correspond to the location and the size of the crystal. Existing segmentation schemes are derived from a broad range of image processing and pattern recognition techniques. A relatively straightforward scheme is to manually click on peak locations on a computer screen and then segment the individual regions, which is labor intensive and time-consuming. Thus, there exists a need in the field to provide a method and system for crystal identification that may address these and other technical challenges.

SUMMARY

One aspect of the present disclosure relates to a method and system for generating and/or correcting a crystal central position map (CCPM) based on a flood histogram. The method may include one or more of the following operations. The flood histogram of a subject may be received. An initial crystal central position map (CCPM) may be determined based on the flood histogram. The initial crystal central position map may include a plurality of crystal central positions. Rows and columns of the plurality of crystal central positions may be formed to generate a labelled crystal central position map. A template may be formed based on the rows and the columns in the labelled crystal central position map. The labelled crystal central position map may be corrected based on the template and the flood histogram to obtain a corrected crystal central position map.

Another aspect of the present disclosure relates to a non-transitory computer readable medium comprising executable instructions. The instructions, when executed by at least one processor, may cause the at least one processor to effectuate a method for generating and/or correcting a CCPM based on a flood histogram.

In some embodiments, to determine the crystal central position map based on the flood histogram may include one or more of the following operations. A zero-one normalization may be performed on the flood histogram to generate a normalized flood histogram I_0. K iterations of decay mask treatment may be performed on I_0 to generate a series of intermediate flood histogram I_i, 1≤i≤K. For each of the intermediate flood histogram I_i, a threshold determination may be performed on the intermediate flood histogram I_i to generate a binary image B_i. The crystal central position map may be generated based on a group including one or more of the K binary images B_i, 1≤i≤K. In some embodiments, the zero-one normalization on a flood histogram may include one or more of the following operations: a linear transformation may be performed on the flood histogram to obtain a transformed flood histogram such that the intensities of pixels in the transformed flood histogram fall in the range between zero and one. In some embodiments, the decay mask treatment on an image may include multiplying the image by the normalized flood histogram I_0.

In some embodiments, the threshold determination on an intermediate flood histogram I_i may be performing an Otsu thresholding algorithm on I_i.

In some embodiments, a crystal central position map may be generated based on one or more of the following operations. An initial collection of connected components C is set to be void, i.e., empty. Then for each B_i=K, K−1, . . . , 2, 1, the set of connected components in B_i is identified, and classified as overlapping or non-overlapping with respect to C. Those non-overlapping connected components in B_i are collected into C. By performing the operations above, the collection of connected components C may grow larger as the index i decreases from K to 1. In some embodiments, a crystal central position map may be generated based on C, by calculating the center of mass of each connected component in C, and collecting the centers of mass of connected components in C as the crystal central position map.

In some embodiments, the crystal central position map may be determined based on calculation of local maximum gray level of the flood histogram.

In some embodiments, rows and columns may be formed based on one or more of the following operations. Hough transformation may be performed on the flood histogram to generate a transformed image. A configuration template may be selected. For a first crystal central position of the plurality of crystal central positions, one or more candidate crystal central positions may be identified based on the selected configuration template and the transformed image. The one or more candidate crystal central positions may be marked as being in a same row or a same column as the first crystal central position.

In some embodiments, the labelled crystal central position map may be corrected based on the template by iteratively regularizing the template.

In some embodiments, a crystal lookup table may be generated based on, for example, a CCPM, a labelled CCPM, or a corrected CCPM. In some embodiments, the crystal lookup table may be generated by delineating boundary lines separating a plurality of crystal central positions based on the corrected crystal central position map. The delineating boundary lines may be performed by dynamic programming. The delineating boundary lines may include substantially minimizing cumulative energy of the boundary lines.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

Some embodiments of the present disclosure is further described in terms of exemplary embodiments. These exemplary embodiments are described in detail with reference to the drawings. These embodiments are non-limiting examples, in which like reference numerals represent similar structures throughout the several views of the drawings, and wherein:

FIG. 13B illustrates an exemplary flood histogram according to some embodiments of the present disclosure;

FIG. 13C illustrates an exemplary initial CCPM according to some embodiments of the present disclosure;

FIG. 13D illustrates an exemplary transformed flood histogram in polar coordinates according to some embodiments of the present disclosure;

FIG. 13E illustrates an exemplary intensity projection diagram according to some embodiments of the present disclosure;

DETAILED DESCRIPTION

Figure 1:
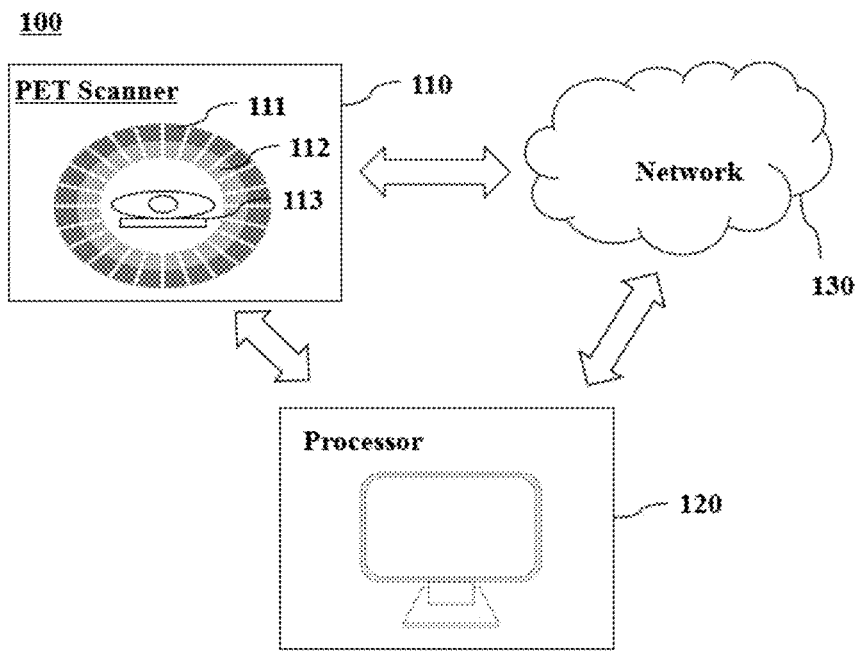
FIG. 1 illustrates an exemplary image processing system according to some embodiments of the present disclosure.

In the following detailed description, numerous specific details are set forth by way of examples in order to provide a thorough understanding of the relevant disclosure. However, it should be apparent to those skilled in the art that some embodiments of the present disclosure may be practiced without such details. In other instances, well known methods, procedures, systems, components, and/or circuitry have been described at a relatively high-level, without detail, in order to avoid unnecessarily obscuring aspects of some embodiments of the present disclosure. Various modifications to the disclosed embodiments will be readily apparent to those skilled in the art, and the general principles defined herein may be applied to other embodiments and applications without departing from the spirit and scope of some embodiments of the present disclosure. Thus, some embodiments of the present disclosure is not limited to the embodiments shown, but to be accorded the widest scope consistent with the claims.

It will be understood that the term "system," "engine," "module," "unit," and/or "block" used herein are one method to distinguish different components, elements, parts, section or assembly of different levels in ascending order. However, the terms may be displaced by other expression if they may achieve the same purpose.

It will be understood that when a unit, engine, module or block is referred to as being "on," "connected to" or "coupled to" another system, unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only, and is not intended to be limiting. As used herein, the singular forms "a," "an," and "the" may be intended to include the plural forms as well, unless the context clearly indicates otherwise. It will be further understood that the terms "include," and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

Provided herein are systems and components for non-invasive biomedical imaging, such as for disease diagnostic or research purposes. The system may include a single imaging modality or multiple imaging modalities for conducting different medical scans or studies, including but not limited to a positron emission tomography (PET), an ultrasound scanning (US), a computed tomography (CT), a digital radiography (DR), a single photon emission computed tomography (SPECT) and a magnetic resonance imaging (MRI).

The multi-modality imaging system of some embodiments of the present disclosure may include a PET scanner and one or more additional imaging modalities, such as PET-MR, PET-US, PET-CT, etc. In a multi-modality system, the mechanisms through which different imaging modalities operate or function may be the same or different. Accordingly, the imaging information may also be the same or different. For example, in some embodiments, the imaging information may be internal and/or external information, and may be functional and/or structural information of a subject. Particularly, in some embodiments, the imaging information of different modalities may complement one another, thereby providing a set of imaging data describing the subject from different analytical angles. For example, in some embodiments, the multi-modality imaging may achieve the merging of morphological and functional images.

The term "subject" as used herein broadly relates to any organic or inorganic mass, natural or man-made, that has a chemical, biochemical, biological, physiological, biophysical and/or physical activity or function. Exemplary embodiments of the subject pertaining to some embodiments of the present disclosure include cells, tissues, organs or whole bodies of human or animal. Other exemplary embodiments include but not limited to a man-made composition of organic and/or inorganic matters that are with or without life.

The above types of imaging modalities that may be included in the present system are not exhaustive and are not limiting. After consulting some embodiments of the present disclosure, one skilled in the art may envisage numerous other changes, substitutions, variations, alterations, and modifications without inventive activity, and it is intended that some embodiments of the present disclosure encompasses all such changes, substitutions, variations, alterations, and modifications as falling within its scope.

In some embodiments of the present disclosure, the multi-modality imaging system may further include modules and components for performing positron emission tomography (PET) imaging and analysis.

This is understood that the following descriptions are provided in connection with medical image processing for illustration purposes and not intended to limit the scope of some embodiments of the present disclosure. The image processing disclosed herein may be used for purposes other than medical treatment or diagnosis. For instance, the image processing may be used for purposes of detecting a fracture within a structure or its progression over time, a non-uniform portion within a piece of material, etc.

For illustration purposes, the following description is provided to help better understanding an image processing. It is understood that this is not intended to limit the scope of some embodiments of the present disclosure. For persons having ordinary skills in the art, a certain amount of variations, changes and/or modifications may be deducted under guidance of some embodiments of the present disclosure. However, those variations, changes and/or modifications do not depart from the scope of some embodiments of the present disclosure.

Some embodiments of the present disclosure relates to positron emission tomography. Specifically, some embodiments of the present disclosure relates to a method and system for crystal identification. The process of crystal identification as illustrated in some embodiments of the present disclosure may be automated, or semi-automated. It may be implemented in a computer-aided and automated medical diagnosis and/or treatment system.

FIG. 1 illustrates an exemplary embodiment of a medical image processing system according to some embodiments of the present disclosure. As shown in the figure, the medical image processing system may include a PET scanner 110, a processor 120 and a network 130.

The PET scanner 110 may be used to examine a subject 113. The PET scanner 110 may include a PET and/or a PET detector. The PET scanner/detector may include a plurality of detector blocks. The detector block may include a plurality of detector arrays. The detector array may include an array of crystals 112. A crystal 112 may be coupled to a photomultiplier tube (PMT) 111 via a light guide. The crystals 112 may be arranged in the form of a matrix.

The processor 120 may process different kinds of information received from the PET scanner 110, the network 130, or the like, or any combination thereof. The information may include data, such as a number, a text, an image, a voice, a force, a model, an algorithm, a software, a program, or the like, or any combination thereof. For example, the information may include a subject information, an operator information, an instrument information, an instruction information, a PET device information, or the like, or any combination thereof. In some embodiments, the subject information may include ethnicity, citizenship, religion, gender, age, matrimony, height, weight, medical history, job, personal habits, organ, tissue, or the like, or any combination thereof. The operator information may include a department, a title, an experience, an operating history, or the like, or any combination thereof. The instrument information may include running status, serial number, operation date, etc. of the image processing system. The instruction information may include, for example, a control command, an operation command, etc. of the image processing system. Merely by way of example, the command for selecting images may be an instruction to select one or more images for detecting changes in images. The PET device information may include product information, such as manufacturer, type, some information of the PET device, the PET scanner or the PET detector, the detector, the crystals, or the like, or any combination thereof.

The processor 120 may perform pre-processing, generate a crystal central position map (CCPM), generate a crystal lookup table (CLT), perform image processing based on CLT, or the like, or any combination thereof. In some embodiments, the pre-processing may relate to image processing including, e.g., crystal identification.

The processor 120 may be a computer, a laptop, a cell phone, a mobile phone, a portable equipment, a pad, a Central Processing Unit (CPU), an Application-Specific Integrated Circuit (ASIC), an Application-Specific Instruction-Set Processor (ASIP), a Graphics Processing Unit (GPU), a Physics Processing Unit (PPU), a Digital Signal Processor (DSP), a Field Programmable Gate Array (FPGA), a Programmable Logic Device (PLD), a Controller, a Microcontroller unit, a Processor, a Microprocessor, an ARM, or the like, or any combination thereof.

The network 130 may establish connection between the PET scanner 110 and the processor 120. The network 130 may be a single network or a combination of different networks. For example, the network 130 may be a local area network (LAN), a wide area network (WAN), a public network, a private network, a proprietary network, a Public Telephone Switched Network (PSTN), a Bluetooth, the Internet, a wireless network, a virtual network, or the like, or any combination thereof.

It should be noted that the imaging system described above is provided for illustration purposes, and not intended to limit the scope of some embodiments of the present disclosure. Apparently for persons having ordinary skills in the art, numerous variations and modifications may be conducted under the teaching of some embodiments of the present disclosure without inventive activity. Some embodiments of the present disclosure is intended to encompass all those variations and modifications as falling under its scope. In some embodiments, the crystals 112 may be scintillation crystals. In some embodiments, the photomultiplier tubes (PMTs) 111 may be replaced by one or more position-sensitive avalanche photodiodes (PSAPDs). In some embodiments, the processor 120 may be connected to an external memory. In some embodiments, the processor 120 may be a server, which may implement and/or store some information and/or process relating to image processing. Merely by way of example, the server may be a cloud server, which may provide computation capacity, storage capacity, or the like, or a combination thereof.

Figure 2:
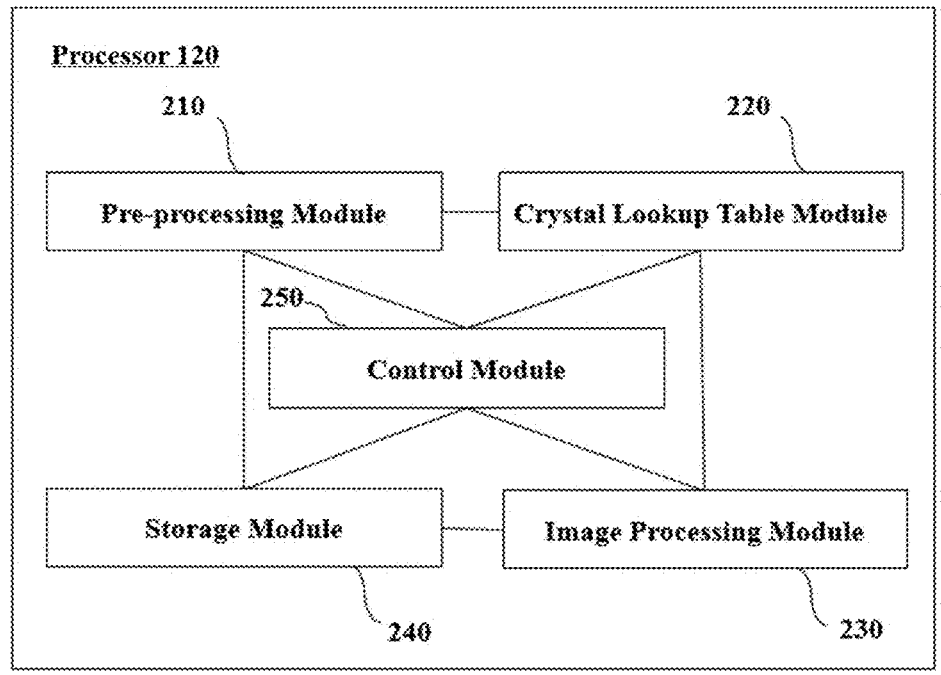
FIG. 2 illustrates an exemplary processor according to some embodiments of the present disclosure.

FIG. 2 illustrates an exemplary block diagram of the processor 120 according to some embodiments of the present disclosure. As shown in the figure, the processor 120 may include a pre-processing module 210, a crystal lookup table module 220, an image processing module 230, a storage module 240 and a control module 250. Each module may connect with other modules or one of other modules. The connection between different modules may be wired or wireless. The wired connection may include using a metal cable, an optical cable, a hybrid cable, an interface, or the like, or any combination thereof. The wireless connection may include using a Local Area Network (LAN), a Wide Area Network (WAN), a Bluetooth, a ZigBee, a Near Field Communication (NFC), a Wi-Fi, a Wireless a Wide Area Network (WWAN), or the like, or any combination thereof.

According to some embodiments of the present disclosure, the pre-processing module 210 may perform pre-processing relating to crystal identification, image processing, etc. For instance, a flood histogram may be pre-processed by the pre-processing module 210 to generate intermediate flood histogram. In some embodiments, the intermediate flood histogram may be a 2D flood histogram of one or more crystals, or a 2D flood histogram of one or more blocks of crystals. The pre-processing may be histogram equalization, de-noising, peak enhancement, or the like, or any combination thereof. De-noising and/or peak enhancement may be based on low-pass filtering, high-pass filtering, local maxima filtering, etc. The pre-processing may enhance the contrast of peaks and/or valleys using top-hat and bottom-hat transformations, which may be based on a morphology method. In some embodiments, the pre-processing may be an image smoothing by applying a Gaussian kernel, whose standard deviation may be set to be one third of the shortest distance between adjacent peaks in the X or Y direction. In some embodiments, Contrast-Limited Adaptive Histogram Equalization (CLAHE) may be used to remove the global intensity inhomogeneity and increase the local contrast of the image. CLAHE may homogenize the distribution of intensity of different spots.

According to some embodiments of the present disclosure, the crystal lookup table module 220 may generate a crystal lookup table (CLT). A crystal central position map (CCPM) that indicates the locations of crystal centers may be generated before the crystal lookup table is generated. The CCPM may be generated from a flood histogram, also referred to as a characteristic flood field response. For example, the CCPM may be generated by locating the local maximum of intensity within the flood histogram.

In some embodiments, the CCPM may be generated based on the analysis of connected components of a set of binary images generated from a 2D flood histogram. In a binary image, the connected component may refer to a connected region inside which all pixel values are one.

A set of binary images may be generated based on a set of intermediate flood histograms, which may be generated by iterative multiplications with a normalized image. The normalized image may be generated by normalization of a flood histogram. The normalized image may be used as a decay mask. The decay mask may be iteratively multiplied with itself to provide multiple intermediate flood histograms. Specifically, a decay mask treatment on an image may be given by multiplying the image by the decay mask. The connected components of the binary image may be generated to determine centers of connected components. A CCPM may be generated based on a judgment whether the connected components overlap.

The crystal central positions inside the CCPM may be labelled by assigning row indices and column indices to the crystal central positions. Such a CCPM with labelled crystal central positions may be referred to as a labelled CCPM. In some embodiments, the crystal central position map (CCPM), labelled or not, may be further corrected. In some embodiments, one or more kinds of artifacts may be removed from the labelled CCPM.

Based on a CCPM (e.g., a labelled CCPM, a corrected CCPM, etc.), a crystal lookup table (CLT) may be generated by delineating the boundaries between crystals in the CCPM. In some embodiments, the crystal lookup table may be generated based on the fusion of different CCPMs, as described elsewhere in the present disclosure.

According to some embodiments of the present disclosure, the image processing module 230 may perform processing relating to image or data from the crystal lookup table module 220, the storage module 240, and/or the control module 250. As used herein, data from the crystal lookup table may be in the form of an image. The image processing module 230 may perform post-processing of crystal identification. For example, in some embodiments, some corrections may be performed by manually adding and/or editing peaks on a flood histogram. Such operations may be provided by different image processing method including, for example, a MATLAB GUI tool.

According to some embodiments of the present disclosure, the storage module 240 may store information relating to crystal identification and/or image processing. The storage module 240 may acquire information from one or more other modules or output information to one or more other modules. Merely by way of example, the storage module 240 may receive and store a crystal lookup table, which may be generated from the crystal lookup table module 220, and then convey it to the image processing module 230. This process may be coordinated and/or controlled by the control module 250. The information stored in the storage module 240 may be acquired from or output to an external storage device including, for example, a floppy disk, a hard disk, a CD-ROM, a network server, a cloud server, a wireless terminal, or the like, or any combination thereof.

The storage module 240 may store information by way of electric energy, magnetic energy, optical energy, or a virtual storage resource, etc. The storage module 240 that may store information by way of electric energy may include Random Access Memory (RAM), Read Only Memory (ROM), flash memory, or the like, or any combination thereof. The storage module 240 that may store information by way of magnetic energy may include a hard disk, a floppy disk, a magnetic tape, a magnetic core memory, a bubble memory, a USB flash drive, or the like, or any combination thereof. The storage module 240 that may store information by way of optical energy may include CD (Compact Disk), VCD (Video Compact Disk), or the like, or any combination thereof. The storage module 240 may store information by way of virtual storage resources. The storage module 240 may include cloud storage, a virtual private network, and/or other virtual storage resources. The method to store information may include sequential storage, link storage, hash storage, index storage, or the like, or any combination thereof.

According to some embodiments of the present disclosure, the control module 250 may control the pre-processing module 210, the crystal lookup table module 220, the image processing module 230, and the storage module 240 in the processor 130 to accomplish crystal identification and/or the generation of a CCPM or a CLT. For example, the control module 250 may receive signals and/or instructions from or send information to the pre-processing module 210, the crystal lookup table module 220, the image processing module 230, and the storage module 240.

It should be noted that the imaging system described above is provided for the purposes of illustration, and not intended to limit the scope of some embodiments of the present disclosure. Apparently for persons having ordinary skills in the art, numerous variations and modifications may be conducted under the teaching of some embodiments of the present disclosure without inventive activity. Some embodiments of the present disclosure is intended to encompass all those variations and modifications as falling under its scope. For example, in some embodiments, these modules may be independent. In some embodiments, part of the modules may be integrated into one module to work together. Merely by way of example, the functioning of the control module 250 may be realized in the crystal lookup table module 220. In some embodiments, the image processing module 230 may perform the fusion of several CCPMs or several crystal lookup tables.

Figure 3:
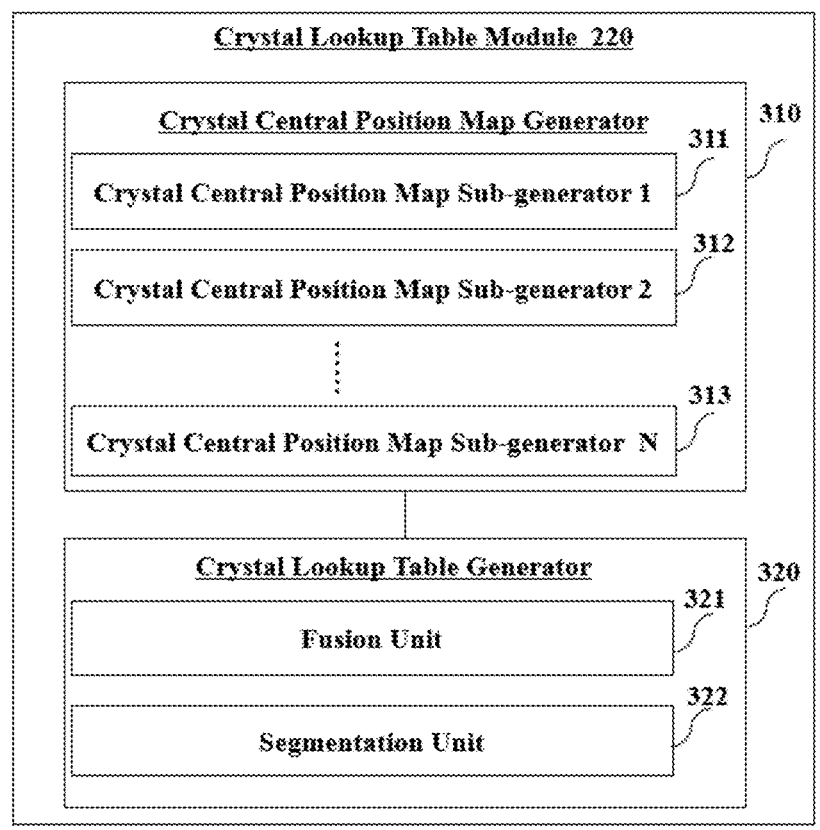
FIG. 3 illustrates an exemplary a crystal lookup table module according to some embodiments of the present disclosure.

FIG. 3 illustrates an exemplary block diagram of crystal lookup table module 220 according to some embodiments of the present disclosure. As shown in the figure, the crystal lookup table module 220 may include a crystal central position map generator 310 and a crystal lookup table generator 320. The crystal central position map generator 310 may generate a crystal central position map. In some embodiments, the crystal central position map generator 310 may include one or more crystal central position map sub-generators. Different crystal central position map sub-generators may generate one or more crystal central position maps (CCPMs) by different methods.

Figure 6:
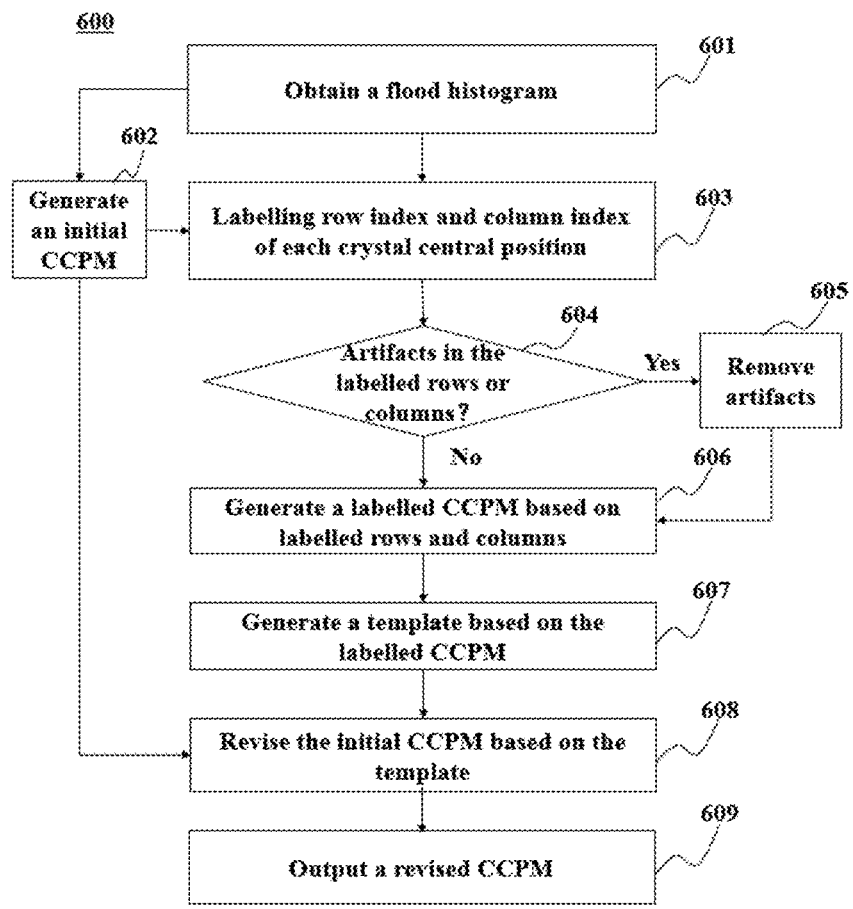
FIG. 6 is a flowchart illustrating an exemplary process for generating a crystal central position map (CCPM) according to some embodiments of the present disclosure.
Figure 7:
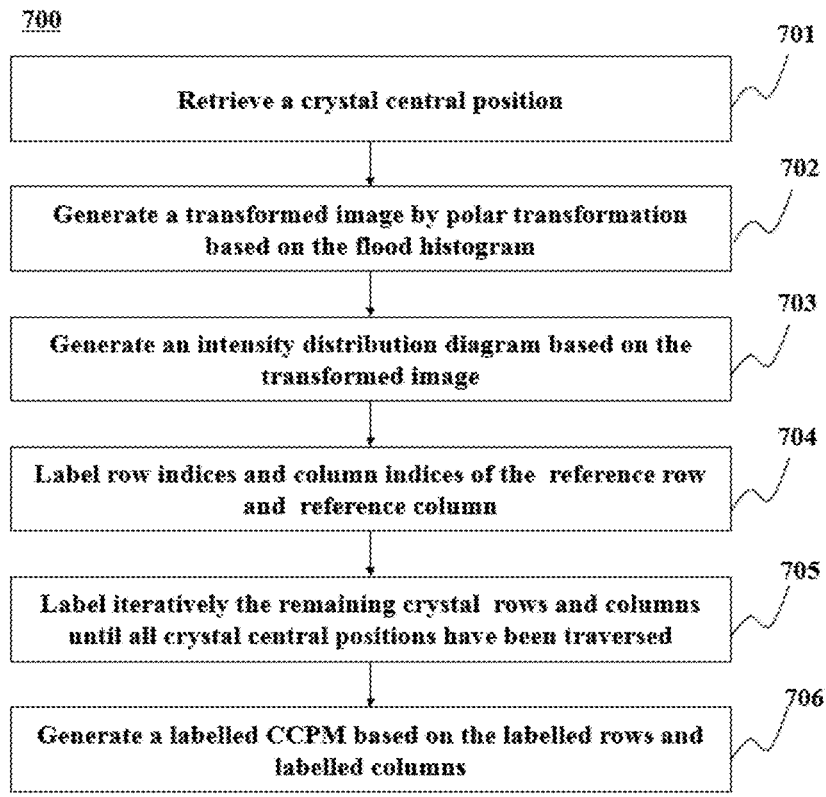
FIG. 7 is a flowchart illustrating an exemplary process for labelling rows and columns in a CCPM according to some embodiments of the present disclosure.

According to some embodiment of the present disclosure, the crystal central position map sub-generator 311 may generate one or more CCPMs based on the method described in FIG. 6 and FIG. 7. In some embodiments, a CCPM may be generated from a flood histogram. A labelled CCPM may be generated by assigning row indices and column indices to crystal central positions in the CCPM. A template may be generated from the labelled CCPM. The crystal central position map (CCPM) may be corrected based on the template. In some embodiments, one or more kinds of artifacts may be removed from the labelled CCPM.

Figure 8:
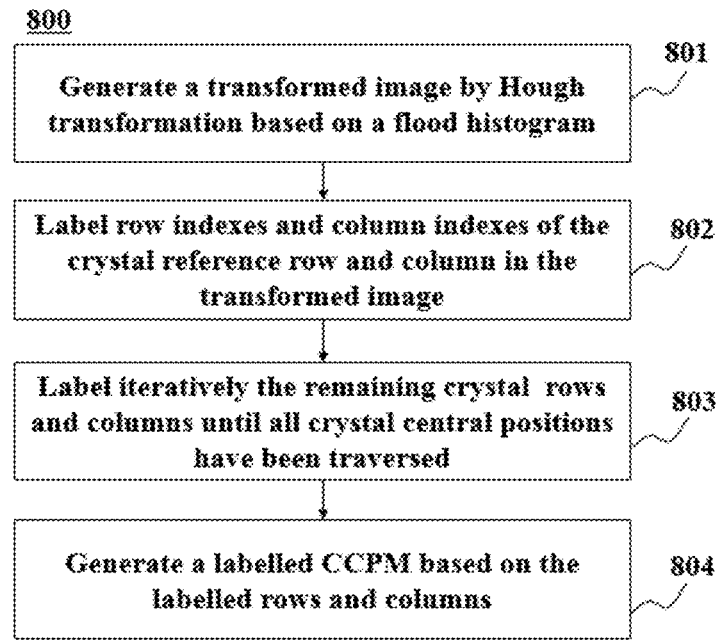
FIG. 8 is a flowchart illustrating an exemplary process for labelling rows and columns in a CCPM according to some embodiments of the present disclosure.

According to some embodiments of the present disclosure, the crystal central position map sub-generator 312 may generate one or more CCPMs based on the method described about FIG. 6 and FIG. 8. In some embodiments, a CCPM may be generated from a flood histogram. A labelled CCPM may be generated by assigning row indices and column indices to crystal central positions in the CCPM. A template may be generated from the labelled CCPM. The crystal central position map (CCPM) may be corrected based on the template. In some embodiments, one or more kinds of artifacts may be removed from the labelled CCPM. In processing of assigning row indices and column indices to crystal central positions in the CCPM, a flood histogram may be subject to Hough transformation to generate a transformed image. A reference row and a reference column of the transformed image may be labelled, and a labelled CCPM based on the reference row and the column may be generated.

Figure 9A:
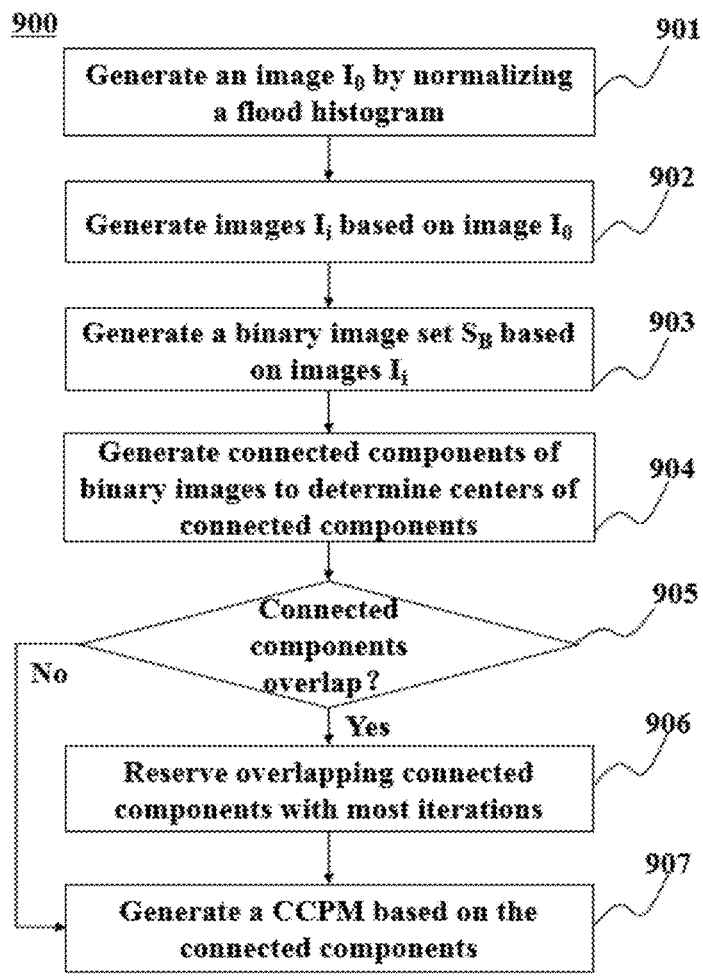
FIG. 9A is a flowchart illustrating an exemplary process for generating a CCPM according to some embodiments of the present disclosure.

According to some embodiments of the present disclosure, the crystal central position map sub-generator 313 may generate one or more CCPMs based on the methods described in FIG. 7 and FIG. 9A. For purposes of illustration, the CCPM may be generated based on the connected components of a binary image generated from a 2D flood histogram. For instance, a normalized image may be generated by normalizing the flood histogram. The normalized image may be used as a decay mask. The decay mask may be iteratively multiplied with itself to provide multiple processed images. A set of binary images may be generated based on the processed images. The connected components of the set of binary images may be generated to determine centers of connected components. A CCPM may be generated based on a judgment whether the connected components overlap.

According to some embodiments of the present disclosure, the crystal lookup table generator 320 may generate a CLT. The CLT may be generated based on the CCPM obtained from the crystal lookup table module 220. The CLT may be generated by delineating the boundaries between crystals in the CCPM. The delineation may be achieved by segmenting the CCPM into regions. The number of regions may be equal to the total number of crystals in the detector arrays. In some embodiments, the crystal lookup table generator 320 may include a fusion unit 321 and a segmentation unit 322. In some embodiments, the fusion unit 321 may fuse CCPMs generated by different methods to generate a new CCPM. Various methods for CCPM generation may be found in, for example, FIGS. 6-9 and the description thereof, and elsewhere in the present disclosure, and the like.

In some embodiments, different CCPMs may be generated by, for example, different crystal central position map sub-generators 311, 312, and 313. In some embodiments, the segmentation unit 322 may delineate the boundaries between crystals in a CCPM.

It should be noted that the imaging system described above is provided for the purpose of illustration, and not intended to limit the scope of some embodiments of the present disclosure. Apparently for persons having ordinary skills in the art, numerous variations and modifications may be conducted under the teaching of some embodiments of the present disclosure without inventive activity. Some embodiments of the present disclosure is intended to encompass all those variations and modifications as falling under its scope. For example, in some embodiments, the crystal central position map generator 310 and the crystal lookup table generator 320 may be integrated into one generator. In some embodiments, there may be more than three crystal central position map sub-generators in the crystal central position map generator 310. In some embodiments, the crystal central position map sub-generators 311, 312 and 313 may be integrated into one generator. In some embodiments, there may be no fusion unit 321 or/and segmentation unit 322 in the crystal lookup table generator 320. In some embodiments, the fusion unit 321 and the segmentation unit 322 may be integrated into one unit.

Figure 4:
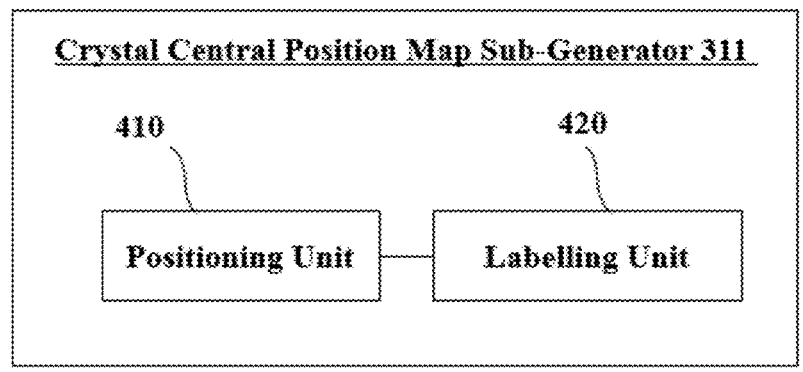
FIG. 4 illustrates an exemplary crystal central position map generator according to some embodiments of the present disclosure.

FIG. 4 illustrates an exemplary block diagram of a crystal central position map generator according to some embodiments of the present disclosure. As shown in the figure, the central position map sub-generator 311 may include a positioning unit 410, and a labelling unit 420.

According to some embodiments of the present disclosure, the positioning unit 410 may identify the position of a crystal. The flood histogram processed by the positioning unit 410 may be received from the PET scanner 110, the storage module 240, the labelling unit 420, a storage device (e.g., a floppy disk, a hard disk, a wireless terminal, a cloud-based storage device, etc.), etc. The positioning of a crystal may include the crystal central position, row index, column index, crystal boundary position, or the like, or any combination thereof. In some embodiments, the positioning unit 410 may identify a crystal central position (CCP). For example, peak detection and peak labelling may be used to identify the CCP. For example, successive non-maximum decay (SNMD) may be used to detect peaks; spline fitting may be used to label or identify rows and columns of the peaks. As used herein, a peak may correspond to a crystal. In some embodiments, the positioning unit 410 may delineate the boundary of a crystal. The positioning unit 410 may generate CCPMs, or boundaries designating the positions of crystals, the like, or any combination thereof.

According to some embodiments of the present disclosure, the labelling unit 420 may correct images or relevant data to obtain more realistic images. The images or data to be corrected may be received from the PET scanner 110, the pre-processing module 210, the crystal lookup table module 220, the image processing module 230, the storage module 240, the crystal central position map generator 310, the crystal lookup table generator 320, the positioning unit 410, a storage device (e.g., a floppy disk, a hard disk, a wireless terminal, a cloud-based storage device, etc.), etc. The images corrected by the labelling unit 420 may include initial images, the pre-processed images, the post-processed images, etc. In some embodiments, the labelling unit 420 may remove artifacts from a labelled CCPM. In some embodiments, the labelling unit 420 may correct a CCPM based on a template. The labelling unit 420 may generate a corrected CCPs and/or a corrected CCPM.

It should be noted that the crystal central position map generator described above is provided for purposes of illustration, and not intended to limit the scope of some embodiments of the present disclosure. Apparently for persons having ordinary skills in the art, numerous variations and modifications may be conducted under the teaching of some embodiments of the present disclosure without inventive activity. Some embodiments of the present disclosure is intended to encompass all those variations and modifications as falling under its scope. For example, in some embodiments, the procedure in the positioning unit 410 and the procedure in the labelling unit 420 may perform sequentially or concurrently. In some embodiments, the positioning unit 410 and the labelling unit 420 may be integrated into one unit or split into more units.

Figure 5:
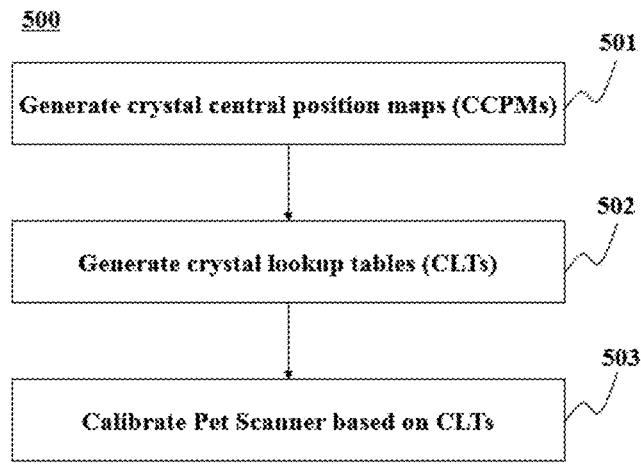
FIG. 5 is a flowchart illustrating an exemplary process for image processing according to some embodiments of the present disclosure.

FIG. 5 is a flowchart illustrating an exemplary process for image processing according to some embodiments of the present disclosure. Process 500 may be performed by processing logic including hardware (e.g., circuitry, dedicated logic, programmable logic, microcode, etc.), software (e.g., instructions run on a processing device to perform hardware simulation), or the like, or a combination thereof. In some implementations, process 500 may be performed by one or more processing devices (e.g., processer 130 as described in connection with FIG. 1 and FIG. 2) and elsewhere in the present disclosure.

To obtain a CLT, a flood histogram of the detector block is first acquired by irradiating the detector with an annihilation photon flood source. As used herein, a flood histogram may describe a two-dimensional distribution of the detected events from the photon detectors. A flood histogram may contain a plurality of pixels. A crystal may be represented by a set of connected pixels in the flood histogram. A peak may correspond to a pixel with the highest intensity for a crystal. The crystal central position may or may not correspond to a peak. For a set of connected pixels in the flood histogram, the center of mass of the set of connected pixels may be determined. The center of mass of a set of connected pixels may be designated as a crystal central position. In some embodiments, the center of mass of a set of connected pixels may be determined by calculating the average X coordinate of the pixels in the set of connected pixels, and the average Y coordinate of the pixels in the set of connected pixels. The average may be an arithmetic average. In some embodiments, the average may be a geometric average. High-resolution PET may include a large number of small-sized crystals in its detector blocks. The small crystal size may result in a low signal-to-noise ratio (SNR), and the large number of crystals may lead to distortion of the crystal array during signal encoding/decoding process. Exemplary artifacts may include ghost artifacts, noise, irregular rotations and broken crystals, or the like, or a combination thereof.

In step 501, a crystal central position map (CCPM) may be generated based on a flood histogram. The flood histogram may undergo some pre-processing to improve its quality. The initial flood histogram may be generated from different PET detectors. In some embodiments, the pre-processing may include histogram equalization, noise reduction, peak enhancement, or the like, or any combination thereof. A CCPM may be obtained by performing crystal identification based on the flood histogram. In some embodiments, a local maxima method may be applied to identify crystal central positions. For example, a morphology method and a Gaussian kernel may be applied to enhance the contrast of the flood image, and peaks in the flood image may be searched and identified. In some embodiments, a successive non-maximum decay (SNMD) algorithm may be applied to obtain an initial CCPM. For example, a CCPM may be generated by iteratively multiplying the flood histogram.

In step 502, a crystal lookup table (CLT) may be generated based on the CCPM. A CLT may be generated by delineating the boundaries between crystals in the CCPM. In some embodiments, various techniques including, for example, clustering, curve/grid fitting, etc., may be utilized to delineate boundaries of crystals in a flood histogram. For example, crystals may be identified using a clustering technique based on, for example, a Gaussian mixture model (GMM), a neural network based self-organizing feature map (NN-SOFM), Fuzzy C-means (FCM), or the like, or any combination thereof. This may be done by segmenting the flood histogram of a detector block into regions. The number of regions may be equal to the total number of crystals in that detector block. In some embodiments, a mathematical algorithm of dynamic programming may be used to produce the crystal boundaries.

In step 503, PET scanner correction may be performed based on the obtained CLT. In some embodiments, more than one CTLs, generated at possibly different times, may be used to calibrate the PET scanner.

It should be noted that the flowchart described above is provided for the purposes of illustration, and not intended to limit the scope of some embodiments of the present disclosure. For persons having ordinary skills in the art, various variations and modifications may be conduct under the teaching of some embodiments of the present disclosure. However, those variations and modifications may not depart from the protecting of some embodiments of the present disclosure.

FIG. 6 is a flowchart illustrating an exemplary process of generating CCPMs according to some embodiments of the present disclosure. Process 600 may be performed by processing logic including hardware (e.g., circuitry, dedicated logic, programmable logic, microcode, etc.), software (e.g., instructions run on a processing device to perform hardware simulation), or a combination thereof. In some implementations, process 600 may be performed by one or more processing devices (e.g., crystal lookup table module 220 of FIG. 2) executing the crystal central position generator 310 as described in connection with FIGS. 3 and 4 above and elsewhere in the present disclosure.

In step 601, a flood histogram may be obtained. The flood histogram may be received from one scan systems (e.g., system 100 of FIG. 1), one or more storage modules 240, a storage device (e.g., a floppy disk, a hard disk, a wireless terminal, a cloud-based storage device, etc.), etc.

In a flood histogram, a crystal may be represented by an intensity spot. In an ideal condition, the radiation of a same radiation source is uniform and crystals may be of a same size and shape, and intensity spots in a flood histogram corresponding to the crystals may be the same and follow an isotropic 2D-Delta-like distribution. In reality, however, different intensity spots may be non-uniform in terms of intensity, orientation, shape, size, or the like, or a combination thereof. The non-uniformity may be due to factors including, for example, imperfection in crystal manufacturing, photon scattering effects, nonlinear distortions of position decoding, or the like, or a combination thereof. In some cases, adjacent spots may be merged with each other, which may be referred to as "merged peaks." A spot at the edge of a crystal array may appear in two flood histograms relating to two adjacent detector blocks, which may lead to the generation of ghost artifacts (also referred to as "cross-talk events").

In step 602, an initial CCPM may be generated based on the flood histogram. In some embodiments, a local maxima method may be applied to identify crystal central positions. For example, a morphology method and a Gaussian kernel may be applied to enhance the contrast of the flood histogram, and peaks in the flood image may be searched and identified. In some embodiments, a crystal peak identification algorithm, such as the successive non-maximum decay (SNMD) algorithm illustrated in FIG. 9A, may be utilized to obtain the initial CCPM.

In step 603, an operation of labelling row index and column index of each crystal central position may be performed. In some embodiments, labelling rows and columns of the CCPM may include three operations. Firstly, a crystal central position x may be selected and designated as the origin in the initial CCPM. Secondly, crystals have the same row and same column as the crystal central position x may be labelled of the CCPM, and the same row and same column may be set as the reference row and reference column. Thirdly, other rows and/or columns of crystals may be labelled based on the reference row and/or the reference column.

In some embodiments, the labelling of rows and/or columns of crystals may be proceeded in a progressive way. Merely by way of example, after a certain number, for example, N, of rows of crystal positions have been labelled, splines may be utilized to curve fit these N rows of crystal positions. A crystal central position z that lies above and near the set of N splines may be chosen, and the crystals lying within the same row as the crystal central position z may be identified and labelled. As another example, after a certain number, for example, N, of rows of crystal positions have been labelled, splines may be utilized to curve fit these N rows of crystal positions. A crystal central position z' that lies below and near the set of N splines may be chosen, and the crystals lying within the same row as z' may be identified and labelled. As a further example, after a certain number, for example, K, of columns of crystal positions have been labelled, splines may be utilized to curve fit these K columns of crystal positions. A crystal central position r that lies to the left of and near the set of K splines may be chosen, and the crystals lying within the same column as the crystal central position r may be identified and labelled. As a still further example, after a certain number, for example, K, of columns of crystal positions have been labelled, splines may be utilized to curve fit these K columns of crystal positions. A crystal central position r' that lies to the right of and near the set of K splines may be chosen, and the crystals lying within the same column as the crystal central position r' may be identified and labelled.

Alternatively, the labelling of rows and/or columns of crystals in a progressive way may be undergone in the following way. Merely by way of example, after a certain number, for example, N, of rows and columns of crystal positions have been labelled, splines may be utilized to curve fit the N rows and columns of crystal positions respectively, forming 2N splines. A crystal central position z that lies on the reference column and near the set of 2N splines may be chosen, and the crystals lying within the same row as the crystal central position z may be identified and labelled. Similarly, a crystal central position r that lies on the reference row and near the set of 2N splines may be chosen, and the crystals lying within the same column as the crystal central position r may be identified and labelled.

In step 604, a judgment may be made as to whether there are ghost artifacts in the labelled rows and/or columns. A ghost artifact may be a fake response caused by the interactions between neighbor detector blocks. In some embodiments, the existence of a ghost artifact may be determined by comparing the number of labelled rows (or columns) with the actual number of rows (or columns) in the detector block. If the number of labelled columns/rows exceeds the number of actual columns/rows, a ghost artifact (e.g., a ghost column/row) may be deemed to exist.

In step 605, ghost artifacts may be removed from labelled rows and/or columns. A ghost artifact may include a ghost spot, a ghost column including multiple ghost spots, a ghost row including multiple ghost spots, etc. A ghost spot may represent an intensity spot in a flood histogram that does not correspond to an actual crystal in a detector block. In some embodiments, ghost spots may be removed one by one. In some embodiments, multiple ghost spots may be removed column by column, and/or row by row. A method of energy weighting may be applied to remove a row or a column containing ghost spots. The removal of a ghost column/row may be repeated until the number of labelled columns/rows equals the number of actual columns/rows in the detector block.

In step 606, a labelled CCPM may be generated based on the labelled rows and labelled columns. A labelled CCPM may have the actual number of rows and actual number of columns.

In step 607, a template may be generated based on the labelled CCPM. Curve fitting may be applied on labelled rows to form row lines, say, by using splines. Similarly, curve fitting may be applied on labelled columns to form column lines, by using splines. A template with smooth row lines and smooth column lines may be generated by regularizing the row lines and column lines of the labelled CCPM. In some embodiments, Gaussian smoothing may be used to regularize or smooth the template and/or adjust the rows and columns. A template may be generated by several iterations of regularization by way of, for example, Gaussian smoothing, etc. It should be noted that the above description about generating template is merely an example, and should not be understood as the only embodiment.

In step 608, a corrected CCPM may be generated based on the template and the initial CCPM. The corrected CCPM may be output in step 609.

FIG. 7 is a flowchart illustrating an exemplary process for labelling rows and columns in a CCPM according to some embodiments of the present disclosure. Process 700 may be performed by processing logic including hardware (e.g., circuitry, dedicated logic, programmable logic, microcode, etc.), software (e.g., instructions run on a processing device to perform hardware simulation), or a combination thereof. In some implementations, process 700 may be performed by one or more processing devices (e.g., crystal lookup table module 220 of FIG. 2) executing the crystal central position generator 310 as described in connection with FIGS. 3-4 above and elsewhere in the present disclosure.

In step 701, a crystal central position x in a flood histogram H_0 may be retrieved. A transformed histogram by polar transformation centered at the crystal central position x may be generated based on a flood histogram in step 702. An intensity distribution diagram based on the transformed histogram may be generated by calculating the projected intensity along a line emanating from the crystal central position x with an inclination angle $\theta$ in step 703. The abscissa of the diagram may be the radian $\theta$ ($0 \leq \theta \leq \pi$), and the ordinate may indicate the projected intensity of the corresponding radian. The projected intensity may reflect the number of crystals in the projection direction. The projected intensity may be (e.g., positively) proportional to the number of crystals projected along the direction of projection.

The row index of the reference row and the column index of the reference column (described below) may be determined and labelled in step 704. Two values of the angle $\theta$, denoted as $\theta\_1$ and $\theta\_2$, where the projected intensities reach local minimum values, may be specified. The two lines L_1 and L_2 emanating from the crystal central position x at inclination angles $\theta\_1$ and $\theta\_2$ may be used as reference lines for determining the reference row and the reference column. A reference row may refer to the row including the crystal central position x and one or more other crystal central positions. A reference column may refer to the column including the crystal central position x and one or more other crystal central positions.

Now a reference row and a reference column crossing x in H_0 may be formed. For example, a threshold d may be specified. For a crystal central position y different from x, the distance between y and L_1 may be calculated. If the distance between y and L_1 is smaller than the threshold d, then y may be considered to belong to the reference row. A reference column may be determined similarly. Specifically, a threshold d' may be specified first. For a crystal central position y different from x, the distance between y and L_2 may be calculated. If the distance between y and L_2 is smaller than the threshold d', then y may be considered to belong to the reference column. In some embodiments, the two selected angles $\theta\_1$ and $\theta\_2$ may be approximately 90 degrees apart, for example, 90±$\epsilon$ degrees apart. The parameter $\epsilon$ may be an angle error. In some embodiments, $\epsilon$ may be set to be less than 10 degrees, or less than 20 degrees, or less than 30 degrees.

In step 705, the labelling of the remaining crystal rows and columns may be performed in a progressive way. Merely by way of example, after a certain number, for example, N, of rows of crystal central positions have been labelled, splines may be utilized to curve fit these N rows of crystal central positions. A crystal central position z that lies above and near the set of N splines may be chosen, and the crystal central positions lying within the same row as the crystal central position z may be identified and labelled. Alternatively, a crystal central position z' that lies below and near the set of N splines may be chosen, and the crystal central positions lying within the same row as the crystal central position z' may be identified and labelled. The row containing the crystal central position z thus formed lying above the set of N splines may be identified first. Alternatively, the row containing the crystal central position z' thus formed lying below the set of N splines may be identified first. In some embodiments, the rows thus formed lying above and below the set of N splines may be identified concurrently.

As a further example, after a certain number, for example, K, of columns of crystal positions have been labelled, splines may be utilized to curve fit these K columns of crystal central positions. A crystal central position t that lies to the left of and near the set of K splines may be chosen, and the crystal central positions lying within the same column as the crystal central position t may be identified and labelled. Alternatively, a crystal central position t' that lies to the right of and near the set of K splines may be chosen, and the crystal central positions lying within the same column as the crystal central position t' may be identified and labelled. The column containing the crystal central position t thus formed lying to the left of the set of K splines may be identified first. Alternatively, the column containing the crystal central position t' thus formed lying to the right of the set of K splines may be identified first. In some embodiments, the columns thus formed lying to the left and right of the set of K splines may be identified concurrently.

Alternatively, the labelling of the remaining rows and/or columns of crystals in a progressive way may be undergone in the following way. Merely by way of example, after a certain number, for example, N, of rows and columns of crystal central positions have been labelled, splines may be utilized to curve fit the N rows and the N columns of crystal central positions respectively, forming 2N splines. A crystal central position z that lies on the reference column and near the set of 2N splines may be chosen, and the crystal central positions lying within the same row as the crystal central position z may be identified and labelled. Similarly, a crystal central position r that lies on the reference row and near the set of 2N splines may be chosen, and the crystal central positions lying within the same column as the crystal central position r may be identified and labelled.

The progression of labelling the crystal rows and columns for remaining crystal central positions may be terminated when all crystal central positions have been traversed. Merely by way of example, the way of traversing may be traversing the crystal central positions that lie above or below the splines formed by the labelled rows until all such crystal central positions have been exhausted. For another example, the way of traversing may be traversing the crystal central positions that lie to the left or right of the splines formed by the labelled columns until all such crystal central positions have been exhausted.

In some embodiments, a procedure of removing artifacts from labelled rows and/or columns may be performed. For example, the procedure of removing artifacts, as described in FIG. 6, may be applied to remove the artifacts from labelled rows and/or labelled columns. The procedure of removing artifacts from labelled rows and/or columns may or may not be performed. A labelled CCPM may then be generated based on the labelled rows and columns in step 706.

FIG. 8 is a flowchart illustrating an exemplary process for labelling rows and columns in a CCPM according to some embodiments of the present disclosure. Process 800 may be performed by processing logic including hardware (e.g., circuitry, dedicated logic, programmable logic, microcode, etc.), software (e.g., instructions run on a processing device to perform hardware simulation), or a combination thereof. In some implementations, process 800 may be performed by one or more processing devices (e.g., crystal lookup table module 220 of FIG. 2) executing the crystal central position generator 310 as described in connection with FIGS. 3-4 above and elsewhere in the present disclosure.

In step 801, a flood histogram may be subject to Hough transformation to generate a transformed image. The transformed image may include a plurality of spots. The value of a spot in the transformed image may represent the probability of the spot located at the center of the transformed image. In some embodiments, spots with the largest values may be selected as a reference row and a column. That is, a reference row and a reference column of the transformed image may be labelled in step 802.

In step 803, the labelling of the remaining crystal rows and columns may be performed in a progressive way. Merely by way of example, after a certain number, for example, N, of rows of crystal central positions have been labelled, splines may be utilized to curve fit these N rows of crystal central positions. A crystal central position z that lies above and near the set of N splines may be chosen, and the crystal central positions lying within the same row as the crystal central position z may be identified and labelled. Alternatively, a crystal central position z' that lies below and near the set of N splines may be chosen, and the crystal central positions lying within the same row as the crystal central position z' may be identified and labelled. The row containing the crystal central position z thus formed lying above the set of N splines may be identified first. Alternatively, the row containing the crystal central position z' thus formed lying below the set of N splines may be identified first. In some embodiments, the rows thus formed lying above and below the set of N splines may be identified concurrently.

As a further example, after a certain number, for example, K, of columns of crystal positions have been labelled, splines may be utilized to curve fit these K columns of crystal central positions. A crystal central position t that lies to the left of and near the set of K splines may be chosen, and the crystal central positions lying within the same column as the crystal central position t may be identified and labelled. Alternatively, a crystal central position t' that lies to the right of and near the set of K splines may be chosen, and the crystal central positions lying within the same column as the crystal central position t' may be identified and labelled. The column containing the crystal central position t thus formed lying to the left of the set of K splines may be identified first. Alternatively, the column containing the crystal central position t' thus formed lying to the right of the set of K splines may be identified first. In some embodiments, the columns thus formed lying to the left and right of the set of K splines may be identified concurrently.

Alternatively, the labelling of the remaining rows and/or columns of crystals in a progressive way may be undergone in the following way. Merely by way of example, after a certain number, for example, N, of rows and columns of crystal central positions have been labelled, splines may be utilized to curve fit the N rows and the N columns of crystal central positions respectively, forming 2N splines. A crystal central position z that lies on the reference column and near the set of 2N splines may be chosen, and the crystal central positions lying within the same row as the crystal central position z may be identified and labelled. Similarly, a crystal central position r that lies on the reference row and near the set of 2N splines may be chosen, and the crystal central positions lying within the same column as the crystal central position r may be identified and labelled.

The progression of labelling the crystal rows and columns for remaining crystal central positions may be terminated when all crystal central positions have been traversed. Merely by way of example, the way of traversing may be traversing the crystal central positions that lie above or below the splines formed by the labelled rows until all such crystal central positions have been exhausted. For another example, the way of traversing may be traversing the crystal central positions that lie to the left or right of the splines formed by the labelled columns until all such crystal central positions have been exhausted.

In some embodiments, a procedure of removing artifacts from labelled rows and/or columns may be performed. For example, the procedure of removing artifacts, as described in FIG. 6, may be applied to remove the artifacts from labelled rows and/or labelled columns. The procedure of removing artifacts from labelled rows and/or columns may or may not be performed. A labelled CCPM may then be generated based on the labelled row and the labelled column in step 804.

The above description of the central cross of FIGS. 6-8 is merely for exemplary purposes, should not be understood as the only embodiments, and these examples do not limit the scope of some embodiments of the present disclosure. For example, the reference row and column may be rhombus, square, rectangle, or the like, or any combination thereof.

FIG. 9A is a flowchart illustrating an exemplary process for generating a CCPM according to some embodiments of the present disclosure.

Process 900 may be performed by processing logic including hardware (e.g., circuitry, dedicated logic, programmable logic, microcode, etc.), software (e.g., instructions run on a processing device to perform hardware simulation), or a combination thereof. In some implementations, process 900 may be performed by one or more processing devices (e.g., crystal lookup table module 220 of FIG. 2) executing the crystal central position generator 310 as described in connection with FIGS. 3-4 above and elsewhere in the present disclosure.

In step 901, a normalized image $I_0$ may be generated by normalizing a flood histogram. In some embodiments, a normalized image may be generated by linearly normalizing the intensities of the pixels in the flood histogram into a range of 0 and 1.

In some embodiments, a threshold may be specified for normalizing the flood histogram. For example, a threshold V may be specified, and a cut-off procedure may be performed as follows. For a pixel whose intensity is above V, the intensity of the pixel is set to be V. For a pixel whose intensity is less than or equal to V, the intensity of the pixel may remain intact. In some embodiments, the threshold may be used to get rid of outliers. Merely by way of example, the threshold V may be set to be a certain value below the maximum intensity of the flood histogram. For example, the threshold V may be a value below the maximum intensity such that the intensity of certain percentage, say 96%, of pixels of the flood histogram lies below V.

In some embodiments, a linear transformation may be performed after the cut-off procedure described above for normalizing the flood histogram. For example, the linear transformation may set the intensities of pixels of the transformed flood histogram to between zero and one.

In step 902, multiple processed images $I_t$ are generated by iterations based on the normalized image. In some embodiments, the normalized image may be used as a decay mask. The mask may be iteratively multiplied with itself. Iterative multiplications may cause the decay of the intensities in non-maximum regions, including artifacts such as noise and ghosts. After a certain number of iterations, intensities of one or more regions may approach 0, and peaks may be decayed to fewer pixels. In some embodiments, the number of iterations may be, for example, 50.

In step 903, a set of binary images SB may be generated by thresholding algorithm based on the processed images generated in step 902. Connected components may be identified based on binary images in step 904. The center of mass of the connected components may be calculated by calculating the average X coordinate and the average Y coordinate of the pixels in the connected components, respectively. Iterative multiplications may cause certain low-energy spots to decay or disappear. To prevent removing spots corresponding to actual crystals, after each iteration, thresholding and connected-component analysis may be applied to identify a set of connected components. The thresholding algorithm may include Otsu thresholding, maximum entropy, isodata algorithm, or the like, or any combination thereof.

The value of or each pixel in the flood histogram may be set as 1 or 0 based on the thresholding algorithm.

In step 905, a judgment may be made regarding whether connected components overlap. Overlapping connected components may include one or more spots exist in different connected components. Overlapping connected components appearing in most generations of binary images may be reserved in step 906. In some embodiments, a connected component may be a candidate for a peak. A candidate may appear for multiple times in multiple generations of binary images. However, the candidate may be reserved for only one time before it disappears in a binary image. In this way, peaks may be detected only once in multiple generations of binary images (e.g., 50 decayed images). A candidate that disappears later may be more reliable than a candidate that disappears sooner. In some embodiments, a candidate that disappears from a binary sooner than a threshold may be deemed to be noise or an artifact. For instance, a candidate that disappears from the fifth generation of binary image or sooner may be deemed as noise or an artifact; a candidate that appears in at least five generations of binary images may be deemed as a true peak corresponding to an actual crystal in a detector block. It should be noted that step 904, step 905, and step 906 may be perform simultaneously for avoiding repetitive computation. In some embodiments, the operations described in steps 904 may be performed on an area including a plurality of connected components, instead of individual connected components, in order to accelerate the process.

In step 907, a CCPM may be generated based on the detected peaks. In some embodiments, a CCPM may be generated by identifying crystal central positions in the flood histogram. The crystal central positions may include central positions of the overlapping connected components and central positions of the non-overlapping connected components.

Figure 9B:
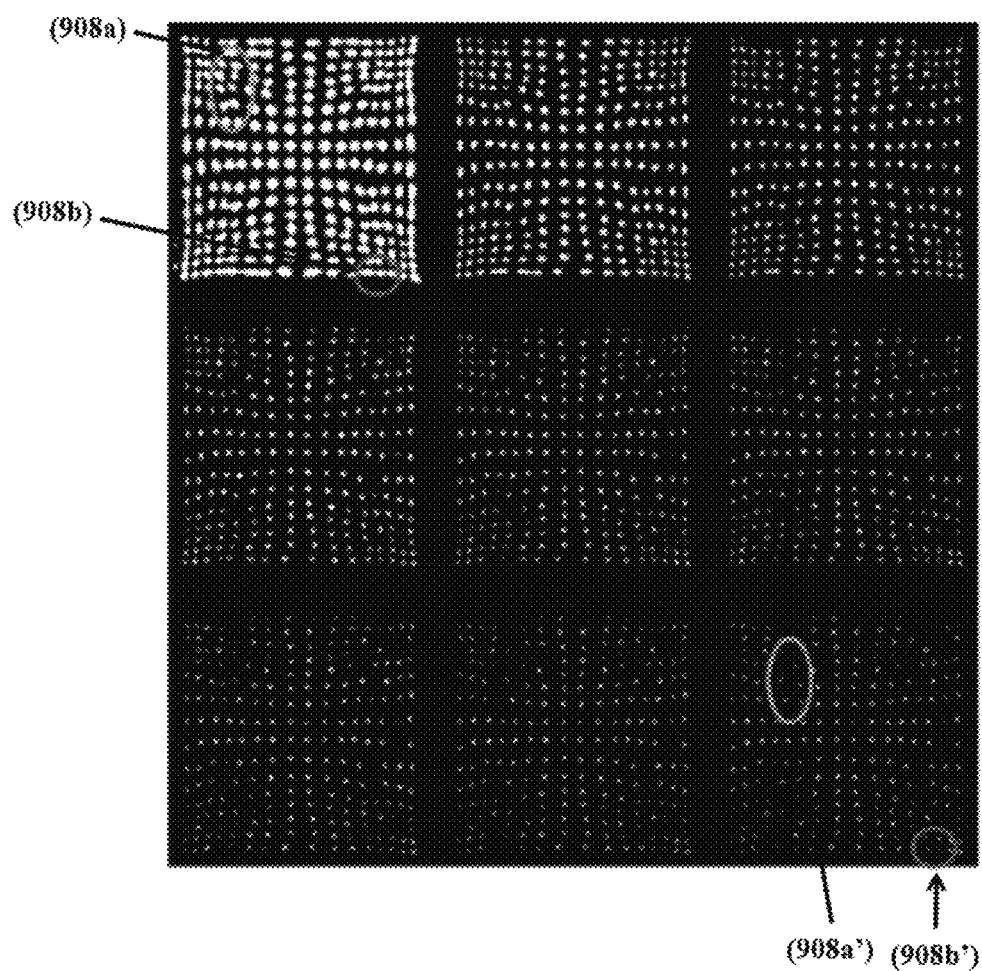
FIG. 9B illustrates exemplary candidate crystal central positions produced by successive non-maximum decay (SNMD) according to some embodiments of the present disclosure.

FIG. 9B is an illustration of candidate crystal central position maps images produced by successive iterations of non-maximum decay (SNMD) algorithm according to some embodiments of the present disclosure. These nine images in FIG. 9B represent intermediate binary images produced by successive iterations of non-maximum decay (SNMD) algorithm, with the number of iterations being in turn 1, 5, 10, 15, 20, 25, 30, 35, 40, respectively. It may be seen from FIG. 9B that as the number of iteration grows, the merged crystals may become separated, and the peak of a crystal central position may grow sharper and clearer, as is shown between the two circled areas 908a and 908a', or between 908b and 908b'.

Figure 10:
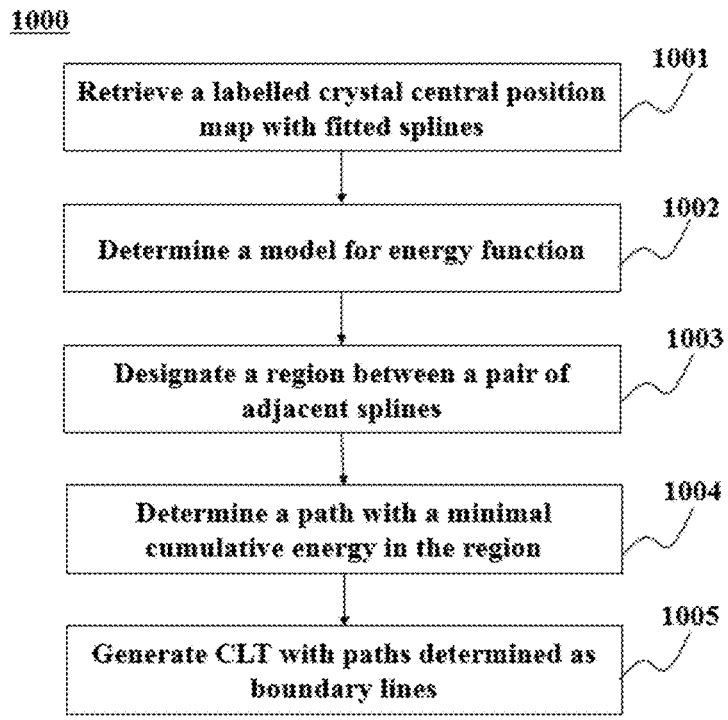
FIG. 10 illustrates a flowchart of an exemplary process for delineating the boundaries between crystals according to some embodiments of the present disclosure.

FIG. 10 illustrates a flowchart of an exemplary process for delineating the boundaries between crystals according to some embodiments of the present disclosure. In step 1001, a labelled crystal central position map may be retrieved. In step 1002, the model may be specified. Exemplary models may include a model for the external energy, a model for the internal energy, and/or a model for the total energy may be specified. For example, the model for the external energy may be $I(x)$, where $I(x)$ may be the gray level value of the pixel x in the flood histogram. As another example, the model for the external energy may be $bI(x)$, where b is a positive number ranging from 0.1 to 100. As a further example, the model for the internal energy may be $d(x, x')$, where $d(x, x')$ is the distance function between the pixels x and x'. The model for the total energy $T(x, x')$ between the pixels x and x' may be $a*d(x, x')+s*I(x)$, where a and s may be the weighting factors of the total energy. Merely by way of example, a may be less than 0.2, and s be may be larger than 1.4.

In step 1003, a region between a pair of adjacent splines may be designated. For example, two adjacent row splines formed by spline-fitting two adjacent rows of crystal central positions, may be chosen, then the region enclosed by the two adjacent row splines may be designated. For another example, two adjacent column splines, i.e. splines curve-fitting a column of crystal central positions, may be chosen, then the region enclosed by the two adjacent column splines may be designated.

In step 1004, a path with a minimal cumulative energy may be determined. The path may be from left to right if the splines chosen in step 1003 are row splines, and the path may be from top to bottom if the splines chosen in step 1003 are column splines. The cumulative energy of the path may be the sum of internal energies of pixels located within the path together with the sum of external energies between adjacent pixels located within the path.

To determine a path with minimal cumulative energy, first the designated region may be divided by w stages. Specifically, two points with the same X coordinate may be connected together to form a stage. By choosing w different X coordinates, w stages may be formed. In some embodiments, the number of stages w may be the same as the number of pixels in a row of flood histogram. In some embodiments, the number of stages w may be the same as the number of pixels in a column of flood histogram. The number of stages w may be no less than the average width of the crystals in a detector block. In some embodiments, w may be larger than the average width of the crystals to achieve a desired smoothness of a boundary line. For example, w may be the width of the crystal central position map.

In some embodiments, for the w stages specified, the stage on the utter left hand side may be designated as the zero-th stage $s\_0$, and the stage to the right hand side of $s\_0$ may be designated sequentially, so that the stage on the utter right hand side may be designated as the w-th stage $s\_\{w-1\}$.

A path may be considered as a series of selected pixels in the sequentially arranged stages in either the X direction or the Y direction. Each pixel may have an external energy. The external energy may relate to the intensity value of the pixel. For example, the external energy of a pixel may be linearly proportional to the intensity of the pixel. As another example, the external energy of a pixel may be quadratically proportional to the intensity of the pixel. Each pixel may have an internal energy. The internal energy may be the distance between this pixel and the pixel that lies on the intersection of the path with the last stage $s\_\{w-1\}$.

For each pixel on stage i, accumulative energy of all pixels from stage zero up to stage i−1 may be calculated. Then the path from stage i to i−1 with minimal accumulative energy may be recorded.

On the final stage, determine the pixel with minimal accumulative energy. From this pixel, retrieve the path by combining recorded paths stage by stage until the stage 0.

In step 1005, a crystal lookup table may be generated by forming the boundary line determined by designating those paths with a minimal cumulative energy. (See FIG. 13J for an illustration of a crystal lookup table and the associated boundary lines within the crystal lookup table).

Figure 11:
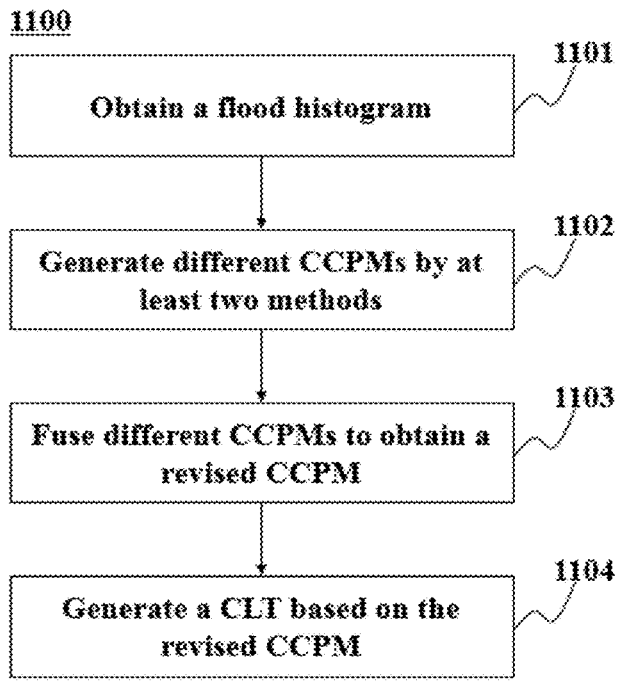
FIG. 11 is a flowchart illustrating an exemplary process for generating CLTs based on fusions of CCPMs generated by different methods according to some embodiments of the present disclosure.

FIG. 11 is a flowchart illustrating an exemplary process for generating a CLT based on fusion of CCPMs generated using different methods according to some embodiments of the present disclosure. Process 1100 may be performed by processing logic including hardware (e.g., circuitry, dedicated logic, programmable logic, microcode, etc.), software (e.g., instructions run on a processing device to perform hardware simulation), or a combination thereof. In some implementations, process 1100 may be performed by one or more processing devices (e.g., crystal lookup table module 220 of FIG. 2) executing the crystal lookup table generator 320 as described in connection with FIGS. 3-4 above and elsewhere in the present disclosure.

A flood histogram may be obtained in step 1101 and different CCPMs may be generated using at least two different methods in step 1102. The flood histogram may be received from one or more scan systems (e.g., system 100 of FIG. 1), storage module 240, a storage device (e.g., a floppy disk, a hard disk, a wireless terminal, a cloud-based storage device, etc.), etc. Different methods of generating CCPMs may include processes described in FIG. 6 through FIG. 9, or the like. A corrected CCPM may be generated by fusing different CCPMs in step 1103. A CLT may be generated based on the corrected CCPM in step 1104.

It should be noted that the above description about methods of generating a CLT based on a CCPM is merely an example, should not be understood as the only embodiment. In some embodiments, a CLT may be generated based a crystal row and column map. In some embodiments, a CLT may be generated based on a crystal boundary map. In some embodiments, a CLT may be generated based on a combination of a CCPM, a crystal row and column map, and a crystal boundary map.

Figure 12A:
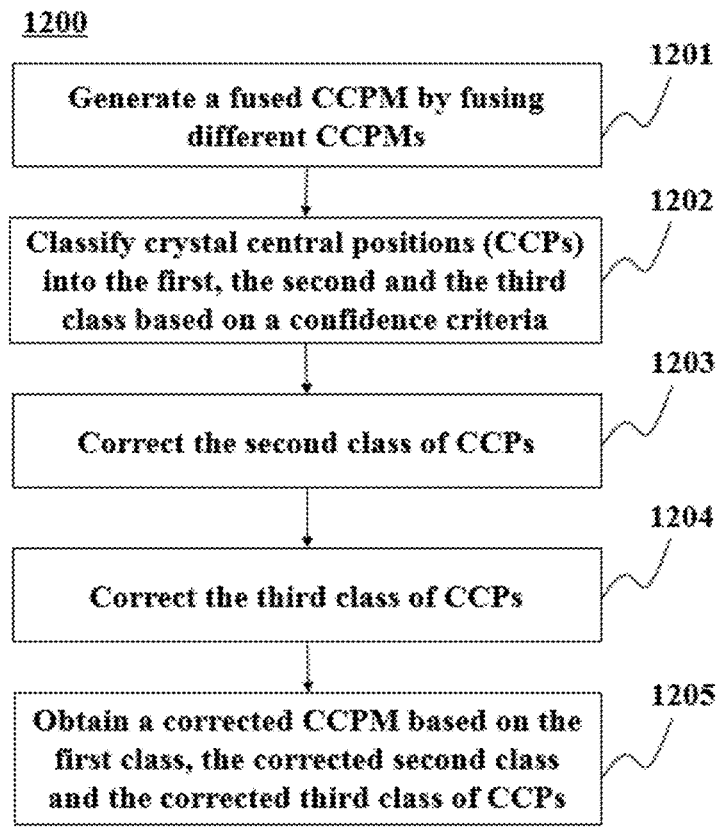
FIG. 12A is a flowchart illustrating an exemplary process for generating CCPMs based on fusions of CCPMs generated by different methods according to some embodiments of the present disclosure.

FIG. 12A is a flowchart illustrating an exemplary process for generating a CCPM based on fusion of CCPMs generated by different methods according to some embodiments of the present disclosure. Process 1200 may be performed by processing logic including hardware (e.g., circuitry, dedicated logic, programmable logic, microcode, etc.), software (e.g., instructions run on a processing device to perform hardware simulation), or a combination thereof. In some implementations, process 1200 may be performed by one or more processing devices (e.g., crystal lookup table module 220 of FIG. 2) executing the crystal lookup table generator 320 as described in connection with FIGS. 3-4 above and elsewhere in the present disclosure.

In step 1201, a fused CCPM may be generated by fusing different CCPMs. To evaluate the CCPs of the fused CCPM, CCPs may be classified into three classes based on a confidence criterion in step 1202. In some embodiments, CCPs may be classified into two classes. In some embodiments, CCPs may be classified into more than two classes. A crystal may be represented or identified by a position, a row index, and/or a column index. For instance, the first class of CCPs may include CCPs having the same position, the same row indices and column indices in different CCPMs, and the first class of CCPs may be retained. The second class of CCPs may include CCPs whose positions are the same in different CCPMs, but row indices and column indices are the same in some CCPMs, but different in one or more other CCPMs. For instance, a CCP whose positions are the same in two out of three different CCPMs may belong to the second class. The third class of CCPs may include CCPs whose positions, row indices, and column indices are different among different CCPMs.

Figure 12B:
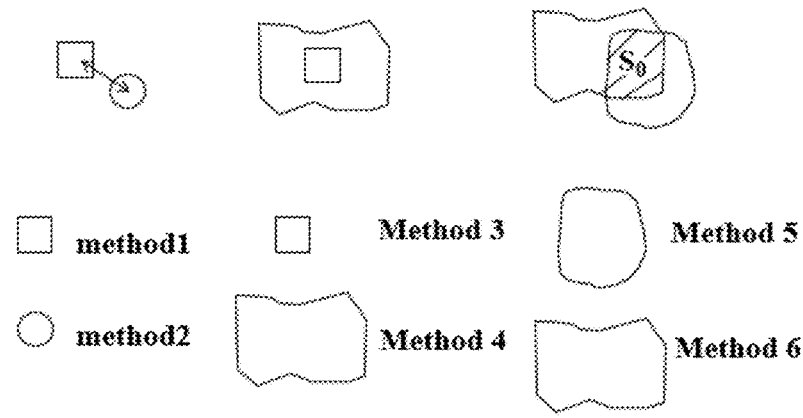
FIG. 12B illustrates three exemplary confidence criterions based on crystal positions according to some embodiments of the present disclosure.

FIG. 12B illustrates three exemplary confidence criterions based on crystal positions according to some embodiments of the present disclosure. The position of a crystal may be represented either by a peak or a block. As illustrated in FIG. 12B, the first confidence criterion may be to judge the distance between the two peaks generated by method 1 and method 2. In some embodiments, the two peaks may be considered to correspond to a same crystal when the distance between the two peaks is below a threshold, for example, 2 pixels. The second confidence criterion may be to judge the relationship between the peak and the block generated by method 3 and method 4, respectively. In some embodiments, the peak generated by method 3 and the block generated by method 4 may be considered to indicate a same crystal when the peak generated by method 3 lies within the range of the block generated by method 4. The third confidence criterion may be to judge the relationship between the block generated by method 5 and the block generated by method 6. In some embodiments, the block generated by method 5 and the block generated by method 6 may be considered to indicate a same crystal when the overlapping area of the two blocks is above a threshold, e.g., two-thirds, of the area of either block.

The second class of CCPs may be corrected in step 1203. In some embodiments, spline fitting may be used to correct the second class of CCPs based on the first class of CCPs and the number and/or arrangement of crystals in a detector block. The third class of CCPs may be corrected in step 1204. In some embodiments, spline fitting may be used to correct the third class of CCPs based on one or more of the following information including the first class of CCPs, the original second class of CCPs, the corrected second class of CCPs, and the number and/or arrangement of crystals in the detector block. A corrected CCPM may be generated based on the first class, the corrected second class, and the corrected third class of CCPs in step 1205.

Figure 12C:
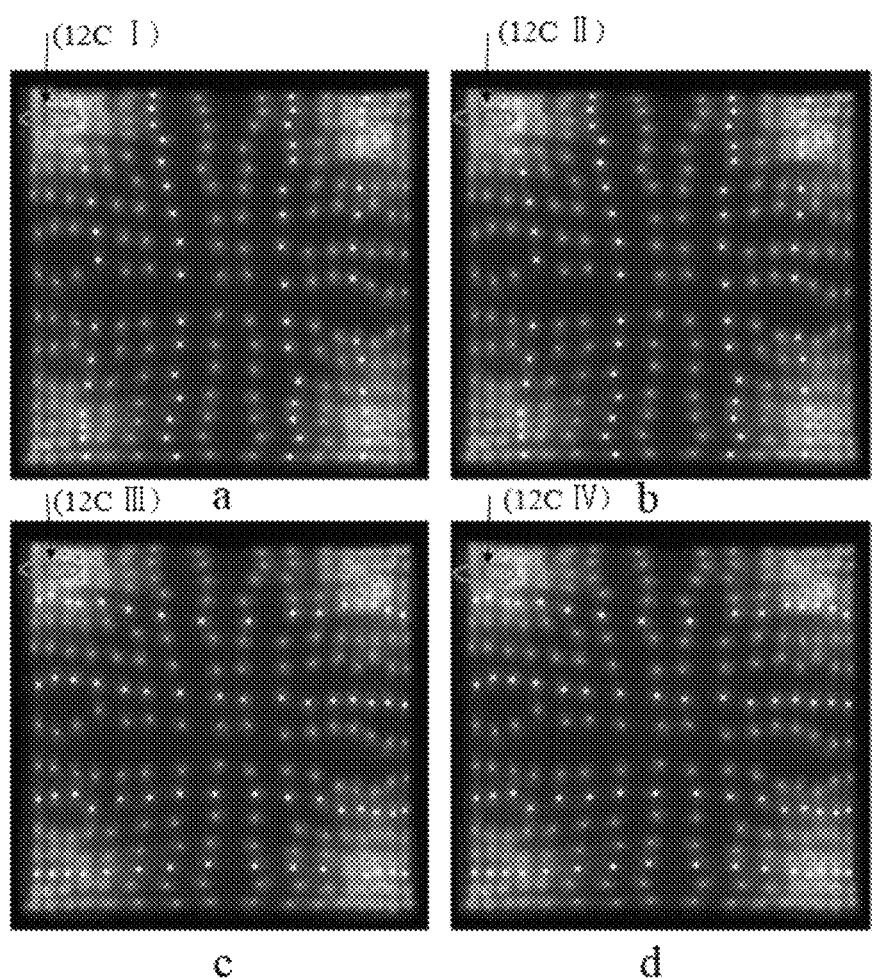
FIG. 12C illustrates the second class of CCPs according to some embodiments of the present disclosure.
Figure 12D:
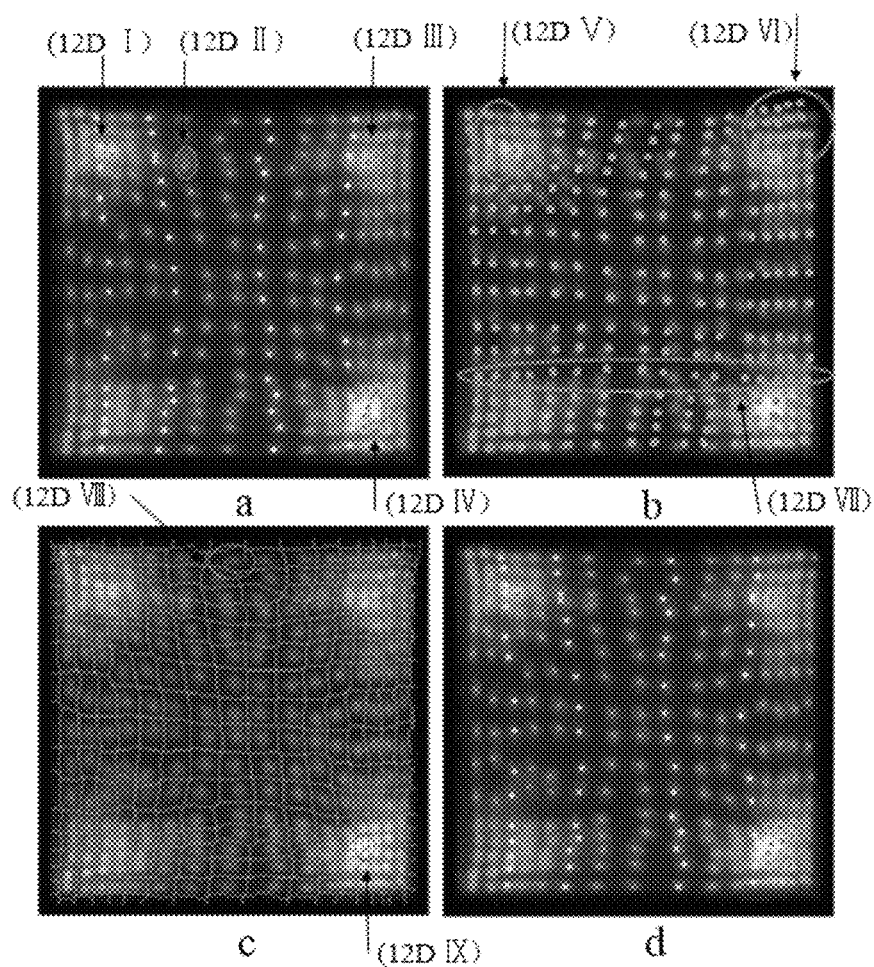
FIG. 12D illustrates different CCPs before and after correction according to some embodiments of the present disclosure.

FIG. 12C illustrate the second class of CCPs according to some embodiments of the present disclosure. Four CCPMs generated by four different methods are shown in FIGS. 12C(a), 12C(b), 12C(c), and 12C(d), respectively. Three CCPs shown in the circled areas 12CI of FIG. 12C(a), 12CII of FIG. 12C(b), 12CIII of FIG. 12C(c), and 12CIV of FIG. 12C(d) may be shown to consistently indicate the positions of three adjacent crystals, while their row indices and column indices may be different. Thus, three CCPs may be classified into the second class. FIG. 12D illustrates different behaviors of CCPs, from 12DI up to 12DIX, before and after the fusion according to some embodiments of the present disclosure. FIG. 12D (a) is an illustration of SNMD, (b) is an illustration of Fourier template registration, (c) is an illustration of NSD, (d) is an illustration of final CCPs.

It should be noted that the above steps of the flow diagrams of FIGS. 5-12A may be executed or performed in any order or sequence not limited to the order and sequence shown and described in the figures. Also, some of the above steps of the flow diagrams of FIGS. 5-12A may be executed or performed substantially simultaneously where appropriate or in parallel to reduce latency and processing times. Furthermore, it should be noted that FIGS. 5-12A are provided as examples only. At least some of the steps shown in these figures can be performed in a different order than represented, performed concurrently, or altogether omitted.

EXAMPLE

The following example is for illustrative purposes only and should not be interpreted as limitations of the claimed invention. There are a variety of alternative techniques and procedures available to those of ordinary skill in the art, which would similarly permit one to successfully perform the intended invention.

Figure 13A:
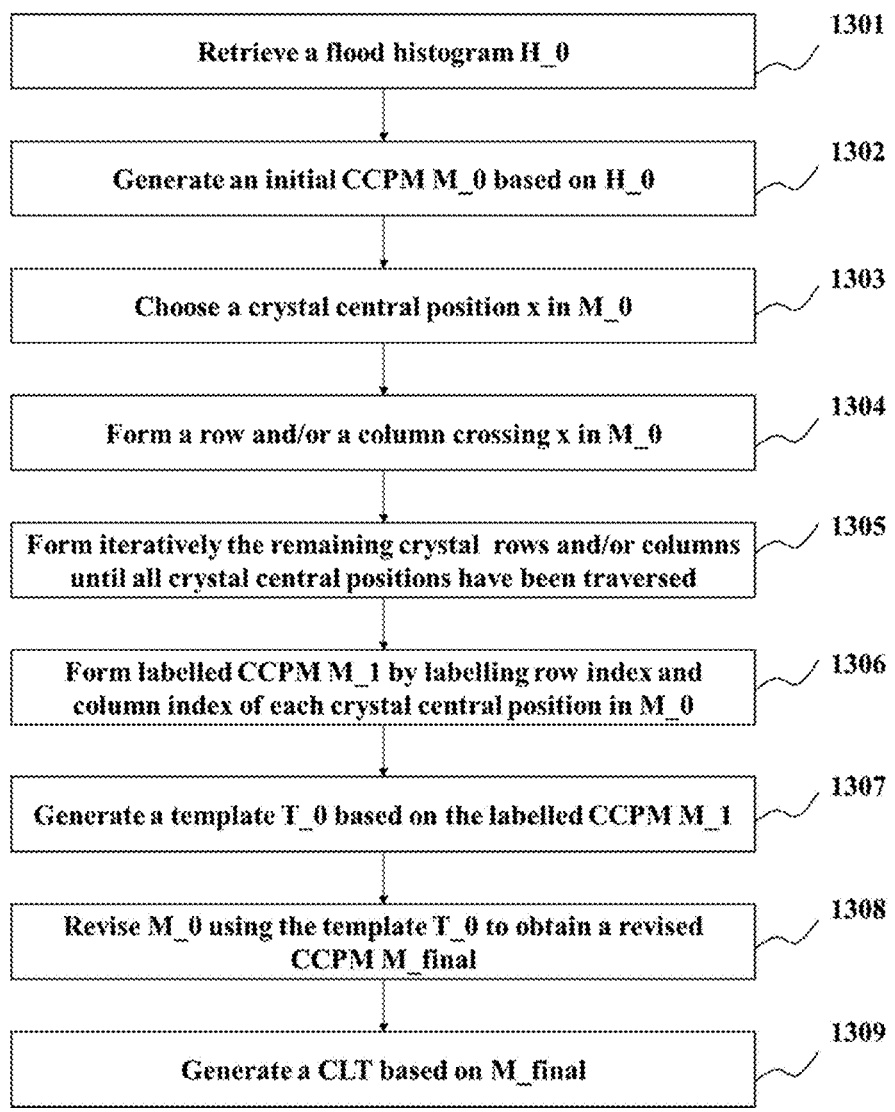
FIG. 13A illustrates an exemplary flowchart of a process for producing a crystal lookup table (CLT) from a flood histogram according to some embodiments of the present disclosure.

FIG. 13A illustrates an exemplary flowchart of a process for producing a crystal lookup table (CLT) from a flood histogram according to some embodiments of the present disclosure. In step 1301, a flood histogram H_0 may be retrieved. The flood histogram may be input from a database, or produced by scanning a subject using a PET scanner. An example of a flood histogram may be seen in FIG. 13B.

In step 1302, an initial crystal central position map (CCPM) M_0 may be produced based on the flood histogram H_0. For example, the initial CCPM may be produced by locating the pixels with local maximum intensities within H_0. An example of an initial CCPM may be found in FIG. 13C. For another example, a crystal peak identification algorithm, such as the one illustration in FIG. 9A, may be utilized to obtain the initial CCPM.

In step 1303, a crystal central position x may be chosen in the CCPM. The selection of the crystal central position x may start near the central area of the CCPM M_0. A crystal in the crystal lookup table may be represented by crystal central position x. In step 1304, those crystal central positions within the same row as crystal central position x may be identified. Similarly, those crystal central positions within the same column as crystal central position x may be identified. The way of identifying the crystal central positions within the same row as x may be found, for example, in the description of FIG. 7. In some embodiments, the way of identifying the crystal central positions within the same row as crystal central position x may be found in the description of FIG. 8. Merely by way of example, the flood histogram H_0 may be transformed to polar coordinates centered at crystal central position x. The transformed flood histogram may be denoted as H_pol. See FIG. 13D for an example of a transformed flood histogram H_pol in polar coordinates. In step 1305, an intensity projection diagram may be formed based on the transformed flood histogram H_pol. Specifically, for each line L emanating from crystal central position x with an inclination angle $\theta$, $0 \leq \theta \leq \pi$, the projected intensity of crystals along the line L may be calculated. Two values of the angle $\theta$, denoted as $\theta\_1$ and $\theta\_2$, where the projected intensities reach local minimum values, may be specified. The two lines L_1 and L_2 emanating from crystal central position x of inclination angles $\theta\_1$ and $\theta\_2$ may be used as reference lines for determining the row and column of the crystal central positions crossing crystal central position x. See FIG. 13E for an example of an intensity projection diagram. It may be seen from FIG. 13E that the projected intensities of crystals reaches minimum values at approximately 10 degrees and 80 degrees. The line L_1 emanating from crystal central position x with the inclination angle of approximately 10 degrees may be chosen as the reference line for determining the row of crystal central positions on which crystal central position x lies. The line L_2 emanating from x with the inclination angle of approximately 80 degrees may be chosen as the reference line for determining the column of crystal central positions on which x lies.

Figure 13F:
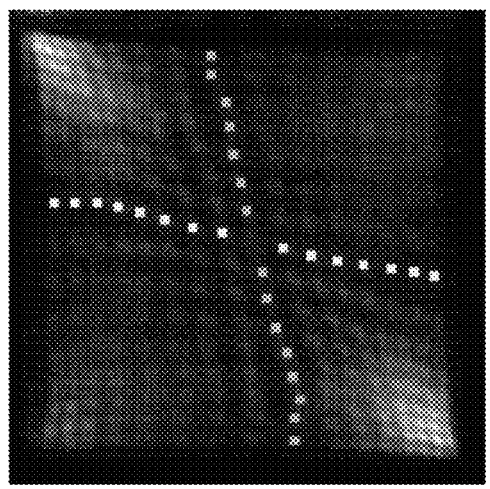
FIG. 13F illustrates an exemplary identification of the row and the column of crystal central positions on which a chosen crystal central position lies according to some embodiments of the present disclosure.

Now a row of crystal central positions and a column of crystal central positions crossing crystal central position x in M_0 may be formed. For example, a threshold d may be specified. For a crystal central position y different from crystal central position x, the distance between y and L_1 may be calculated. If the distance between y and L_1 is smaller than the threshold d, then y may be considered to belong to the same row as crystal central position x. A column of crystal central positions on which crystal central position x lies may be determined similarly. See FIG. 13F for an example of the row and the column of crystal central positions on which crystal central position x lies.

In step 1305, the labelling of the remaining crystal rows and columns may be performed in a progressive way. Merely by way of example, after a certain number, for example, N, of rows of crystal central positions have been labelled, splines may be utilized to curve fit these N rows of crystal central positions. A crystal central position z that lies above and near the set of N splines may be chosen, and the crystal central positions lying within the same row as the crystal central position z may be identified and labelled. Alternatively, a crystal central position z' that lies below and near the set of N splines may be chosen, and the crystal central positions lying within the same row as the crystal central position z' may be identified and labelled. The row containing the crystal central position z thus formed lying above the set of N splines may be identified first. Alternatively, the row containing the crystal central position z' thus formed lying below the set of N splines may be identified first. In some embodiments, the rows thus formed lying above and below the set of N splines may be identified concurrently.

As a further example, after a certain number, for example, K, of columns of crystal positions have been labelled, splines may be utilized to curve fit these K columns of crystal central positions. A crystal central position t that lies to the left of and near the set of K splines may be chosen, and the crystal central positions lying within the same column as the crystal central position t may be identified and labelled. Alternatively, a crystal central position t' that lies to the right of and near the set of K splines may be chosen, and the crystal central positions lying within the same column as the crystal central position t' may be identified and labelled. The column containing the crystal central position t thus formed lying to the left of the set of K splines may be identified first. Alternatively, the column containing the crystal central position t' thus formed lying to the right of the set of K splines may be identified first. In some embodiments, the columns thus formed lying to the left and right of the set of K splines may be identified concurrently.

Alternatively, the labelling of the remaining rows and/or columns of crystals in a progressive way may be undergone in the following way. Merely by way of example, after a certain number, for example, N, of rows and columns of crystal central positions have been labelled, splines may be utilized to curve fit the N rows and the N columns of crystal central positions respectively, forming 2N splines. A crystal central position z that lies on the reference column and near the set of 2N splines may be chosen, and the crystal central positions lying within the same row as the crystal central position z may be identified and labelled. Similarly, a crystal central position r that lies on the reference row and near the set of 2N splines may be chosen, and the crystal central positions lying within the same column as the crystal central position r may be identified and labelled.

The progression of labelling the crystal rows and columns for remaining crystal central positions may be terminated when all crystal central positions have been traversed. Merely by way of example, the way of traversing may be traversing the crystal central positions that lie above or below the splines formed by the labelled rows until all such crystal central positions have been exhausted. For another example, the way of traversing may be traversing the crystal central positions that lie to the left or right of the splines formed by the labelled columns until all such crystal central positions have been exhausted.

In some embodiments, another traversing mechanism may be deployed to determine if the crystal central positions in M_0 have been traversed, i.e. whether each crystal central position in M_0 has been assigned to a row of crystal central positions and a column of crystal central positions. In some embodiment, the traversing mechanism may be implemented by choosing a crystal central position x in M_0 first, and then label the reference column and reference row crossing x. Then two adjacent columns to the reference columns may be identified and labelled secondly, followed by the identification and labelling of two adjacent rows to the reference rows. This procedure of identifying-and-labelling may be performed repeatedly by identifying and labelling the two adjacent columns, followed by the identifying and labelling of the two adjacent row until all crystal central positions have been traversed.

In some embodiments, the traversing mechanism may be performed using a configuration template. The configuration template may take a shape of a rhombus, a rectangle, a triangle, or a polygon on which the vertices have been designated an order of traversing. For example, if a template having the shape of a rhombus is provided, and x lies at the center of the rhombus, then the order of traversing may be that the crystal central positions closest to x along reference row and reference column may be traversed first to determine to which row or column they belong in M_0.

After the crystal central positions in a CCPM have been traversed in step 1305, each crystal central position in the CCPM may be assigned a row and column. A procedure of artifacts removal may be performed thereafter. Specifically, if the number of columns obtained is larger than the actual number of columns, then one or more ghost columns may have been obtained and need to be removed. Similarly, if the number of rows obtained is larger than the actual number of rows, then one or more ghost rows may have been obtained and need to be removed. An exemplary procedure of removing ghost columns and/or ghost rows has been disclosed in the description of FIG. 6 and elsewhere in the present disclosure.

Figure 13G:
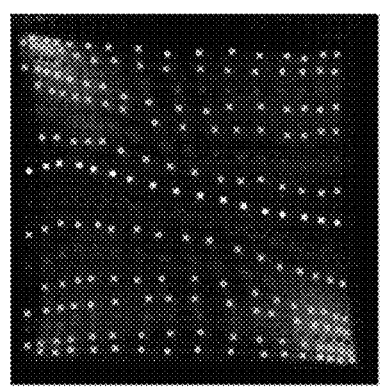
FIG. 13G illustrates an exemplary distribution of rows in the labelled CCPM according to some embodiments of the present disclosure.
Figure 13H:
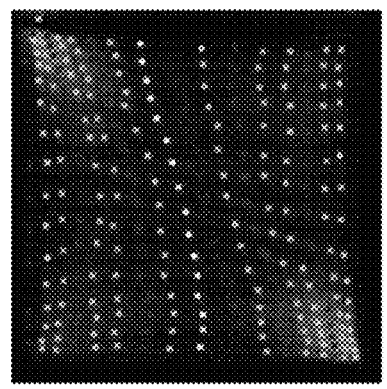
FIG. 13H illustrates an exemplary distribution of columns in the labelled CCPM according to some embodiments of the present disclosure.

In step 1306, each remaining (after removal of ghost column(s)/row(s)) crystal central position z may be assigned a row index i, and a column index j, indicating that the crystal central position z lies in the i-th row and j-th column in M_0. The crystal central position map with each remaining crystal central position z being assigned its row index and column index may be referred to as a labelled CCPM M_1. (See FIG. 13G for an illustration on the distribution of rows in the labelled CCPM, and see FIG. 13H for an illustration on the distribution of columns in the labelled CCPM).

Figure 13I:
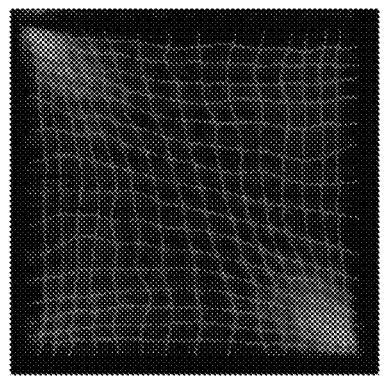
FIG. 13I illustrates an exemplary template according to some embodiments of the present disclosure.
Figure 13J:
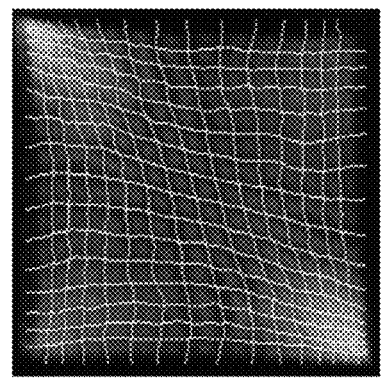
FIG. 13J illustrates an exemplary crystal lookup table and the associated boundary lines within the crystal lookup table according to some embodiments of the present disclosure.

In step 1307, a template T_0 may be generated based on the labelled CCPM M_1. In some embodiments, the template T_0 may be produced by curve-fitting the rows and the columns of crystal central positions in M_1 by splines. The template may take the form of a grid. The choice of splines may be based on the desired smoothness and the desired order of the spline function. For example, a third order spline may be utilized to form the template. See FIG. 13I for an illustration of a template T_0.

In step 1308, the crystal central position map M_0 may be corrected using the template T_0 by regularizing the template T_0 iteratively. For example, T_0 may be modified by smoothing the splines according to the desired smoothness to generate a smoothened template T_1. This process may be referred to as smoothing.

The crystal central position map M_0 may then be compared to the smoothened template T_1. If the cross point x of splines forming a row and a column of T_1 does not correspond to a crystal central position in M_0, the cross point x may be replaced by its closest crystal central position x' in M_0. The same row index and the column index for x may be assigned to x'. A template T_2 may be generated by curve-fitting the x's. The process of generating T_2 by comparing M_0 with T_1 to re-locate the cross points in M_0 may be referred to as cross_points_picking_and_fitting.

The process of regularizing T_0 may be accomplished by repeating the processes of smoothing and cross_point_picking_and_fitting until a desired smoothness of splines is achieved. For example, the desired smoothness of splines may be such that the maximum absolute value of the third order derivative of the splines is less than a threshold.

The template obtained after regularizing T_0 may be referred to as T_final, and the crystal central position map given by the cross points in T_final may be referred to as M_final.

In step 1309, a crystal lookup table (CLT) may be produced based on M_final. Specifically, for the crystal central positions within M_final, the procedure specified in FIG. 10 for delineating the boundaries between crystals may be employed. The boundary lines thus produced based on M_final may provide a crystal lookup table that describes the correspondence between pixels in H_0 with crystals in a detector block.

The example described above are provided to give those of ordinary skill in the art a complete disclosure and description of how to make and use the embodiments of the arrangements, devices, compositions, systems and methods of the disclosure, and are not intended to limit the scope of what the inventors regard as their disclosure. For example, the method of generating a crystal lookup table shown in FIG. 13A may be used as one of the multiple methods for fusing the multiple CCPMS as explained in FIG. 11. All patents and publications mentioned in the specification are indicative of the levels of skill of those skilled in the art to which the disclosure pertains.

As will be also appreciated, the above described method embodiments may take the form of computer or controller implemented processes and apparatuses for practicing those processes. The disclosure may also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention.

The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Computer program code for carrying out operations for aspects of some embodiments of the present disclosure may be written in any combination of one or more programming languages, including an object oriented programming language such as Java, C++, C#, VB, Scala, Smalltalk, Eiffel, JADE, Emerald, NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

While the invention has been described with reference to various embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending," "receiving," "generating," "providing," "calculating," "executing," "storing," "producing," "determining," "reducing," "registering," "reconstructing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terms "first," "second," "third," "fourth," etc. as used herein are meant as labels to distinguish among different elements and may not necessarily have an ordinal meaning according to their numerical designation.

In some implementations, any suitable computer readable media can be used for storing instructions for performing the processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in connectors, conductors, optical fibers, circuits, and any suitable media that is fleeting and devoid of any semblance of permanence during transmission, and/or any suitable intangible media.

Accordingly, methods, systems, and media for image reconstruction are provided. Although the disclosed subject matter has been described and illustrated in the foregoing illustrative implementations, it is understood that some embodiments of the present disclosure has been made only by way of example, and that numerous changes in the details of implementation of the disclosed subject matter can be made without departing from the spirit and scope of the disclosed subject matter.

The entire disclosure of each document cited (including patents, patent applications, journal articles, abstracts, laboratory manuals, books, or other disclosures) in the Background, Summary, Detailed Description, and Examples is hereby incorporated herein by reference. All references cited in this disclosure are incorporated by reference to the same extent as if each reference had been incorporated by reference in its entirety individually. However, if any inconsistency arises between a cited reference and some embodiments of the present disclosure, some embodiments of the present disclosure takes precedence.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the disclosure claimed. Thus, it should be understood that although the disclosure has been specifically disclosed by preferred embodiments, exemplary embodiments and optional features, modification and variation of the concepts herein disclosed can be resorted to by those skilled in the art, and that such modifications and variations are considered to be within the scope of this disclosure as defined by the appended claims.

When a Markush group or other grouping is used herein, all individual members of the group and all combinations and possible sub-combinations of the group are intended to be individually included in the disclosure. Every combination of components or materials described or exemplified herein can be used to practice the disclosure, unless otherwise stated. One of ordinary skill in the art will appreciate that methods, device elements, and materials other than those specifically exemplified can be employed in the practice of the disclosure without resort to undue experimentation. All art-known functional equivalents, of any such methods, device elements, and materials are intended to be included in this disclosure. Whenever a range is given in the specification, for example, a temperature range, a frequency range, a time range, or a composition range, all intermediate ranges and all subranges, as well as, all individual values included in the ranges given are intended to be included in the disclosure. Any one or more individual members of a range or group disclosed herein can be excluded from a claim of this disclosure. The disclosure illustratively described herein suitably can be practiced in the absence of any element or elements, limitation or limitations that is not specifically disclosed herein.

What is claimed is:

1. A method comprising:
   receiving a flood histogram relating to a subject;
   determining a crystal central position map based on the flood histogram, the crystal central position map comprising a plurality of crystal central positions;
   forming rows and columns of the plurality of crystal central positions to generate a labelled crystal central position map;
   forming a template based on the rows and the columns in the labelled crystal central position map; and
   correcting the labelled crystal central position map based on the template to obtain a corrected crystal central position map.

2. The method of claim 1, the determining the crystal central position map based on the flood histogram comprising:
   performing a zero-one normalization on the flood histogram to generate a normalized flood histogram $I\_0$;
   performing K iterations of decay mask treatment on $I\_0$ to generate a series of intermediate flood histogram $I\_i$, $1 \leq i \leq K$;
   for each of the intermediate flood histogram $I\_i$, performing a threshold determination on $I\_i$ to generate a binary image $B\_i$; and
   generating the crystal central position map based on a group comprising the binary images $B\_i$, $1 \leq i \leq K$.

3. The method of claim 2, the performing a zero-one normalization on the flood histogram comprising:
   performing a linear transformation on the flood histogram to obtain a transformed flood histogram, intensities of the transformed flood histogram falling in a range between zero and one.

4. The method of claim 2, the decay mask treatment comprising:
   multiplying an image by the normalized flood histogram $I\_0$.

5. The method of claim 2, the performing a threshold determination on $I\_i$ comprising performing an Otsu thresholding algorithm on $I\_i$.

6. The method of claim 2, the generating a crystal central position map comprising:
   setting an initial collection of connected components C to be void;
   for each $B\_i$, $i=K, K-1, \ldots, 2, 1$,
   identifying a plurality of connected components in $B\_i$;
   classifying the connected components in $B\_i$ as overlapping or non-overlapping with respect to C;
   collecting the set of non-overlapping connected components in $B\_i$ into C; and
   creating the crystal central position map based on C.

7. The method of claim 6 further comprising:
   for each of the connected components in C, identifying a center of mass of the connected component as a crystal central position in the flood histogram.

8. The method of claim 1, the determining the crystal central position map comprising
   calculating a local maximum gray level of the flood histogram.

9. The method of claim 1, the forming rows and columns comprising
- performing Hough transformation on the flood histogram to generate a transformed image;
- selecting a configuration template;
- for a first crystal central position of the plurality of crystal central positions, identifying one or more candidate crystal central positions based on the selected configuration template and the transformed image; and
- marking the one or more candidate crystal central positions as in a same row or a same column as the first crystal central position.

10. The method of claim 1, the correcting the labelled crystal central position map based on the template comprising:
- iteratively regularizing the template.

11. A non-transitory computer readable medium comprising executable instructions that, when executed by at least one processor, cause the at least one processor to effectuate a method comprising:
- receiving a flood histogram relating to a subject;
- determining a crystal central position map based on the flood histogram, the crystal central position map comprising a plurality of crystal central positions;
- forming rows and columns of the plurality of crystal central positions to generate a labelled crystal lookup table;
- forming a template based on the rows and the columns in the labelled crystal central position map; and
- correcting the labelled crystal central position map based on the template to obtain a corrected crystal central position map.

12. The non-transitory computer readable medium of claim 11, the determining the candidate crystal central position map based on the flood histogram comprising:
- performing a zero-one normalization on the flood histogram to generate a normalized flood histogram $I\_0$;
- performing K iterations of decay mask treatment on $I\_0$ to generate a series of intermediate flood histogram $I\_i$, $1 \leq i \leq K$;
- for each of the intermediate flood histogram $I\_i$, performing a threshold determination on $I\_i$ to generate a binary image $B\_i$; and
- generating the crystal central position map based on a group comprising the binary images $B\_i$, $1 \leq i \leq K$.

13. The non-transitory computer readable medium of claim 12, the performing a zero-one normalization on the flood histogram comprising:
- performing a linear transformation on the flood histogram so that a range of transformed intensities is between zero and one.

14. The non-transitory computer readable medium of claim 12, the decay mask treatment comprising:
- multiplying an image by the normalized flood histogram $I\_0$.

15. The non-transitory computer readable medium of claim 12, the performing automatic threshold determination on $I\_i$ further comprising:
- performing an Otsu thresholding algorithm.

16. The non-transitory computer readable medium of claim 12, the generating a crystal central position map based on the binary images $B\_i$, $1 \leq i \leq K$, comprising:
- setting the initial collection of connected components C to be void;
- for each $B\_i$, $i=K, K-1, \ldots, 2, 1$,
- identifying a plurality of connected components in $B\_i$;
- classifying the connected components in $B\_i$ as overlapping or non-overlapping with respect to C;
- collecting the set of non-overlapping connected components in $B\_i$ into C; and
- creating the crystal central position map based on C.

17. The non-transitory computer readable medium of claim 16, the generating a crystal central position map further comprising:
- for each of the connected components in C, identifying center of mass of the connected component as a crystal central position in the flood histogram associated with the connected component.

18. The non-transitory computer readable medium of claim 11, the determining the crystal central position map comprising:
- calculating a local maximum gray level of the flood histogram.

19. The non-transitory computer readable medium of claim 11, the forming rows and columns comprising
- performing Hough transformation on the flood histogram to generate a transformed image;
- selecting a configuration template;
- for a first crystal central position of the plurality of crystal central positions, identifying one or more candidate crystal central positions based on the selected configuration template and the transformed image; and
- marking the one or more candidate crystal central positions as in a same row or a same column as the first crystal central position.

20. The non-transitory computer readable medium of claim 11, the correcting the labelled crystal central position map based on the template comprising:
- iteratively regularizing the template.

* * * * *